US010594784B2

United States Patent
Kansal et al.

(10) Patent No.: US 10,594,784 B2
(45) Date of Patent: Mar. 17, 2020

(54) GEO-DISTRIBUTED DISASTER RECOVERY FOR INTERACTIVE CLOUD APPLICATIONS

(71) Applicant: Microsoft Technology Licensing, LLC, Redmond, WA (US)

(72) Inventors: Aman Kansal, Redmond, WA (US); Sriram Govindan, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 541 days.

(21) Appl. No.: 14/076,715

(22) Filed: Nov. 11, 2013

(65) Prior Publication Data
US 2015/0134723 A1 May 14, 2015

(51) Int. Cl.
*G06F 11/14* (2006.01)
*H04L 12/24* (2006.01)
(Continued)

(52) U.S. Cl.
CPC ...... *H04L 67/1031* (2013.01); *G06F 11/2023* (2013.01); *G06F 11/2094* (2013.01);
(Continued)

(58) Field of Classification Search
CPC ..... H04L 69/40; H04L 43/00; H04L 67/1095; H04L 67/14; H04L 67/1031; H04L 67/1097
(Continued)

(56) References Cited

U.S. PATENT DOCUMENTS 6,480,894 B1 * 11/2002 Courts ............... G06F 17/3089
707/E17.116
7,437,594 B1 * 10/2008 Mount ............... G06F 11/2035
709/224
(Continued)

FOREIGN PATENT DOCUMENTS

CN 1688979 A 10/2005
CN 101535978 A 9/2009
(Continued)

OTHER PUBLICATIONS

"Second Written Opinion Issued in PCT Application No. PCT/US2014/063614", dated Oct. 7, 2015, 5 Pages.
(Continued)

*Primary Examiner* — Vivek Srivastava
*Assistant Examiner* — Binod J Kunwar
(74) *Attorney, Agent, or Firm* — Alleman Hall Creasman & Tuttle LLP

(57) ABSTRACT

Disaster recovery is provided for an application that is being hosted on a current data center, thus ensuring the availability of the application. An option for replicating session state data for the application is selected. This selection is made from a set of different session state data replication options each of which has different performance and resource cost trade-offs. The selected option determines how the session state data for the application is to be replicated. The selected option is implemented, where the implementation results in the session state data for the application being replicated outside of the current data center, thus ensuring that this data remains available in the event that the current data center goes offline.

17 Claims, 6 Drawing Sheets

(51) Int. Cl.

| | | |
|---|---|---|
| *H04L 12/26* | (2006.01) | |
| *H04L 29/06* | (2006.01) | |
| *H04L 29/08* | (2006.01) | |
| *H04L 29/14* | (2006.01) | |
| *G06F 11/20* | (2006.01) | |
| *G06F 11/34* | (2006.01) | |
| *G06F 11/30* | (2006.01) | |

(52) U.S. Cl.
CPC ...... *G06F 11/2097* (2013.01); *G06F 11/3419* (2013.01); *H04L 41/0654* (2013.01); *H04L 67/1095* (2013.01); *H04L 67/1097* (2013.01); *H04L 67/14* (2013.01); *H04L 69/40* (2013.01); *G06F 11/3006* (2013.01); *H04L 41/0668* (2013.01); *H04L 43/0864* (2013.01); *H04L 63/045* (2013.01)

(58) Field of Classification Search
USPC .......................................... 709/203; 714/6.3
See application file for complete search history.

(56) References Cited

U.S. PATENT DOCUMENTS

| | | | | |
|---|---|---|---|---|
| 7,698,416 | B2* | 4/2010 | Potti ................... | H04L 67/1008 709/224 |
| 7,711,848 | B2* | 5/2010 | Maes ................. | H04L 12/5692 709/238 |
| 7,844,851 | B2 | 11/2010 | Cosmadopoulos et al. | |
| 8,024,566 | B2* | 9/2011 | Stanev ............... | G06Q 20/3829 380/45 |
| 8,064,356 | B1* | 11/2011 | Krzanowski ............ | H04L 41/04 370/249 |
| 8,281,014 | B2* | 10/2012 | Stanev .............. | G06F 17/30899 709/223 |
| 8,285,684 | B2 | 10/2012 | Prahlad et al. | |
| 8,359,491 | B1* | 1/2013 | Bloomstein ......... | G06F 11/1662 714/6.3 |
| 8,725,890 | B2* | 5/2014 | Liu ..................... | H04L 12/1868 709/230 |
| 8,954,786 | B2* | 2/2015 | Mordani ................. | H04L 67/28 714/4.12 |
| 9,378,060 | B2* | 6/2016 | Jansson ................. | G06F 9/4862 |
| 2003/0110266 | A1* | 6/2003 | Rollins ................... | H04L 29/06 709/227 |
| 2005/0010588 | A1* | 1/2005 | Zalewski ............ | G06F 11/2069 |
| 2006/0036761 | A1* | 2/2006 | Amra .................. | H04L 67/1095 709/238 |
| 2006/0168334 | A1* | 7/2006 | Potti ................... | H04L 67/1008 709/239 |
| 2006/0248119 | A1* | 11/2006 | Stanev ..................... | G06F 9/461 |
| 2006/0285489 | A1* | 12/2006 | Francisco ........... | H04L 12/2602 370/229 |
| 2007/0180309 | A1* | 8/2007 | Zohar ................. | G06F 11/2058 714/6.12 |
| 2007/0192326 | A1* | 8/2007 | Angal ................. | G06F 11/1482 |
| 2007/0220155 | A1* | 9/2007 | Nalla .................... | H04L 67/141 709/227 |
| 2008/0080374 | A1* | 4/2008 | Nuzman ............. | H04L 41/0896 370/230 |
| 2009/0144344 | A1* | 6/2009 | McBride ........... | G06F 17/30575 |
| 2009/0319824 | A1* | 12/2009 | Liu ..................... | H04L 12/1868 714/4.1 |
| 2010/0228819 | A1 | 9/2010 | Wei | |
| 2010/0228824 | A1* | 9/2010 | Lin ..................... | H04L 12/1818 709/204 |
| 2010/0299552 | A1* | 11/2010 | Schlack ................. | H04L 47/10 714/4.1 |
| 2010/0325484 | A1* | 12/2010 | Suzuki ................ | G06F 11/1443 714/14 |
| 2011/0055627 | A1* | 3/2011 | Zawacki ................. | H04L 67/14 714/15 |
| 2012/0084261 | A1* | 4/2012 | Parab ................ | G06F 17/30156 707/654 |
| 2012/0159595 | A1* | 6/2012 | Barham .............. | H04L 67/1095 726/7 |
| 2012/0260157 | A1* | 10/2012 | Zhu ................... | G06F 17/30902 715/234 |
| 2013/0031403 | A1* | 1/2013 | Mordani ................. | H04L 67/28 714/4.11 |
| 2013/0054822 | A1* | 2/2013 | Mordani ............. | H04L 67/1034 709/228 |
| 2013/0073670 | A1 | 3/2013 | Das et al. | |
| 2014/0040206 | A1* | 2/2014 | Ramakrishnan .... | G06F 11/2097 707/640 |
| 2014/0074780 | A1* | 3/2014 | Goetsch ................. | H04L 67/10 707/613 |
| 2014/0181051 | A1* | 6/2014 | Montulli ........... | G06F 17/30129 707/679 |
| 2014/0215255 | A1* | 7/2014 | Zaheer ................. | G06F 11/004 714/1 |
| 2015/0112931 | A1* | 4/2015 | Bourbonnais ....... | H04L 67/1095 707/626 |

FOREIGN PATENT DOCUMENTS

| | | |
|---|---|---|
| CN | 102202061 A | 9/2011 |
| CN | 102498715 A | 6/2012 |

OTHER PUBLICATIONS

Abe, et al., "vTube: Efficient Streaming of Virtual Appliances Over Last-Mile Networks", 2013 Association for Computing Machinery (ACM) Symposium on Cloud Computing (SOCC '13), Oct. 1-3, 2013, pp. 16, ACM, Santa Clara, California.

Amazon Web Services (AWS) Team, "Summary of the AWS Service Event in the US East Region", Jul. 2, 2012, pp. 4, Amazon Web Services, Inc., retrieved at <<http://aws.amazon.com/message/67457/>>.

Argyraki, et al., "Verifiable Network-Performance Measurements", Proceedings of the 6th International Conference on emerging Networking EXperiments and Technologies (CoNEXT 2010), Nov. 30-Dec. 3, 2010, pp. 12, Association for Computing Machinery (ACM), Philadelphia, Pennsylvania.

Bailis, et al., "Eventual consistency today: limitations, extensions, and beyond", Communications of the Association for Computing Machinery (ACM), May 2013, pp. 55-63, vol. 56 Issue 5, ACM, New York, New York.

Bailis, et al., "Probabilistically Bounded Staleness for Practical Partial Quorums", 38th International Conference on Very Large Data Bases (VLDB), Aug. 27-31, 2012, pp. 776-787, Proceedings of the VLDB Endowment, vol. 5, No. 8, VLDB Endowment, Istanbul, Turkey.

Baker, et al., "Megastore: Providing Scalable, Highly Available Storage for Interactive Services", 5th Biennial Conference on Innovative Data Systems Research (CIDR '11), Jan. 9-12, 2011, pp. 223-234, CIDR Conference, Asilomar, California.

Barker, et al., "Empirical Evaluation of Latency-sensitive Application Performance in the Cloud", Proceedings of the First Annual Association for Computing Machinery (ACM) SIGMM Conference on Multimedia Systems (MMSys '10), Feb. 22-23, 2010, pp. 12, ACM, Phoenix, Arizona.

Birman, "The Process Group Approach to Reliable Distributed Computing", Communications of the Association for Computing Machinery (ACM), Dec. 1993, pp. 37-103, vol. 36, No. 12, ACM, New York, New York.

Brewer, "Towards Robust Distributed Systems", Keynote Presentation at Nineteenth Association for Computing Machinery (ACM) Symposium on Principles of Distributed Computing (PODC 2000), Jul. 19, 2000, pp. 12, Portland, Oregon, retrieved at <<http://www.cs.berkeley.edu/~brewer/cs262b-2004/PODC-keynote>>.

Brutlag, "Speed Matters for Google Web Search", Jun. 22, 2009, pp. 1, Google, Inc., retrieved at <<http://services.google.com/fh/files/blogs/google_delayexp.pdf>>.

(56) References Cited

OTHER PUBLICATIONS

Calder, et al., "Windows Azure Storage: A Highly Available Cloud Storage Service with Strong Consistency", 23rd Association for Computing Machinery (ACM) Symposium on Operating Systems Principles (SOSP '11), Oct. 23-26, 2011, pp. 143-157, ACM, Cascais, Portugal.

Chandra, et al., "Unreliable Failure Detectors for Reliable Distributed Systems", Journal of the Association for Computing Machinery (ACM), Mar. 1996, pp. 225-267, vol. 43, No. 2, ACM, New York, New York.

Cisco Systems, Inc., "Design Best Practices for Latency Optimization", Cisco White Paper, 2007, pp. 1-8, Cisco Systems, Inc., San Jose, California, retrieved at <<http://www.cisco.com/application/pdf/en/us/guest/netsol/ns407/c654/ccmigration_09186a008091d542.pdf>>.

Cisco Systems, Inc., "Distributed Virtual Data Center for Enterprise and Service Provider Cloud", Cisco White Paper, Jan. 2012, pp. 1-34, Cisco Systems, Inc. San Jose, California.

Citrusbyte, "Introduction to Redis", Oct. 25, 2013, pp. 1, Citrusbyte, LLC, retrieved at <<http://redis.io/topics/introduction>>.

Cooper, et al., "PNUTS: Yahoo!'s Hosted Data Serving Platform", Proceedings of the Very Large Data Bases (VLDB) Endowment (VLDB '08), Aug. 24-30, 2008, pp. 12, Association for Computing Machinery (ACM), Auckland, New Zealand.

Corbett, et al., "Spanner: Google's Globally-Distributed Database", Proceedings of the 10th USENIX Conference on Operating Systems Design and Implementation (OSDI '12), Oct. 8-10, 2012, pp. 14, USENIX Association, Hollywood, California.

Cully, et al., "Remus: high availability via asynchronous virtual machine replication", Proceedings of the 5th USENIX Symposium on Networked Systems Design and Implementation (NSDI '08), Apr. 16-18, 2008, pp. 161-174, USENIX Association, San Francisco, California.

Decandia, et al., "Dynamo: Amazon's Highly Available Key-value Store", Proceedings of Twenty-first Association for Computing Machinery (ACM) SIGOPS Symposium on Operating Systems Principles (SOSP '07), Oct. 14-17, 2007, pp. 205-220, ACM, Stevenson, Washington.

Dhawan, et al., "Fathom: A Browser-based Network Measurement Platform", Proceedings of the 2012 Association for Computing Machinery (ACM) Conference on Internet Measurement Conference (IMC '12), Nov. 14-16, 2012, pp. 14, ACM, Boston, Massachusetts.

Dischinger, et al., "Characterizing Residential Broadband Networks", Proceedings of the 7th Association for Computing Machinery (ACM) Special Interest Group on Data Communication (SIGCOMM) Conference on Internet Measurement (IMC '07), Oct. 24-26, 2007, pp. 14, ACM, San Diego, California.

Dolev, et al., "On the Minimal Synchronism Needed for Distributed Concensus", Journal of the Association for Computing Machinery (ACM), Jan. 1987, pp. 77-97, vol. 34, No. 1, ACM, New York, New York.

Dovrolis, et al., "What do packet dispersion techniques measure?", Proceedings of the Twentieth Annual Joint Conference of the Institute of Electrical and Electronics Engineers (IEEE) Computer and Communications Societies (INFOCOM 2001), Apr. 22-26, 2001, pp. 10, vol. 2, IEEE, Anchorage, Alaska.

Dwork, et al., "Consensus in the presence of partial synchrony", Journal of the Association for Computing Machinery (ACM), Apr. 1988, pp. 288-323, vol. 35 Issue 2, ACM, New York, New York.

Fischer, et al., "Impossibility of Distributed Concensus with One Faulty Process", Journal of the Association for Computing Machinery (ACM), Apr. 1985, pp. 374-382, vol. 32, No. 2, ACM, New York, New York.

Fletcher, "Introduction to SignalR", Feb. 27, 2013, pp. 5, Microsoft Corporation, retrieved at <<http://www.asp.net/signalr/overview/signalr-1x/getting-started/introduction-to-signalr>>.

Ghita, et al., "Network Tomography on Correlated Links", Proceedings of the 10th Association for Computing Machinery (ACM) Special Interest Group on Data Communication (SIGCOMM) Conference on Internet Measurement (IMC '10), Nov. 1-3, 2010, pp. 14, ACM, Melbourne, Australia.

Gilbert, et al., "Brewer's Conjecture and the Feasibility of Consistent, Available, Partition-Tolerant Web Services", Association for Computing Machinery (ACM) Special Interest Group on Algorithms and Computational Theory (SIGACT) News, Jun. 2002, pp. 51-59, vol. 33 Issue 2, ACM, New York, New York.

Google App Engine Team, "Post-mortem for Feb. 24, 2010 outage", Mar. 4, 2010, pp. 4, Google Groups, retrieved at <<https://groups.google.com/forum/print/msg/google-appengine/p2QKJOOSLc8/7MtZ3YC9TqQJ>>.

Gray, et al., "Milliseconds Matter: An Introduction to Microstrategies and to Their Use in Describing and Predicting Interactive Behavior", Journal of Experimental Psychology: Applied, May 2000, pp. 322-335, vol. 6, No. 4, ; American Psychological Association, Inc., Washington, DC.

Gummadi, et al., "King: Estimating Latency between Arbitrary Internet End Hosts", Proceedings of the 2nd Association for Computing Machinery (ACM) Special Interest Group on Data Communication (SIGCOMM) Workshop on Internet measurment (IMW '02), Nov. 6-8, 2002, pp. 14, ACM, Marseille, France.

Hajjat, et al., "Cloudward Bound: Planning for Beneficial Migration of Enterprise Applications to the Cloud", Proceedings of the Association for Computing Machinery (ACM) Special Interest Group on Data Communication (SIGCOMM) 2010 Conference (SIGCOMM '10), Aug. 30-Sep. 3, 2010, pp. 12, ACM, New Delhi, India.

Hamilton, "Inter-Datacenter Replication & Geo-Redundancy", Perspectives: James Hamilton's Blog, May 10, 2010, pp. 9, James Hamilton, published online, retrieved at <<http://perspectives.mvdirona.com/2010/05/10/InterDatacenterReplicationGeoRedundancy.aspx>>.

Huang, et al., "An In-depth Study of LTE: Effect of Network Protocol and Application Behavior on Performance", Proceedings of the Association for Computing Machinery (ACM) Special Interest Group on Data Communication (SIGCOMM) 2013 Conference (SIGCOMM '13), Aug. 12-16, 2013, pp. 12, ACM, Hong Kong, China.

Ji, et al., "A Comparison of Hard-state and Soft-state Signaling Protocols", Institute of Electrical and Electronics Engineers (IEEE) / Association for Computing Machinery (ACM) Transactions on Networking, Apr. 2007, pp. 281-294, vol. 15 Issue 2, IEEE Press, Piscataway, New Jersey.

Kansal, et al., "Using Dark Fiber to Displace Diesel Generators", Proceedings of the 14th USENIX Conference on Hot Topics in Operating Systems (HotOS '13), May 13-15, 2013, pp. 7, USENIX Association, Santa Ana Pueblo, New Mexico.

Kohavi, et al., "Practical Guide to Controlled Experiments on the Web: Listen to Your Customers not tb the HiPPO", Proceedings of the 13th Association for Computing Machinery (ACM) International Conference on Knowledge Discovery and Data Mining (KDD '07), Aug. 12-15, 2007, pp. 9, ACM, San Jose, California.

Kraska, et al., "Consistency Rationing in the Cloud: Pay only when it matters", Proceedings of the Very Large Data Bases (VLDB) Endowment (VLDB '09), Aug. 24-28, 2009, pp. 12, vol. 2 Issue 1, Association for Computing Machinery (ACM), Lyon, France.

Kumar, et al., "A Cloud-Assisted Design for Autonomous Driving", Proceedings of the First Edition of the MCC Workshop on Mobile Cloud Computing (MCC '12), Aug. 17, 2012, pp. 6, Association for Computing Machinery (ACM), Helsinki, Finland.

Li, et al., "CloudCmp: Comparing Public Cloud Providers", Proceedings of the 10th Association for Computing Machinery (ACM) Special Interest Group on Data Communication (SIGCOMM) Conference on Internet Measurement (IMC '10), Nov. 1-3, 2010, pp. 14, ACM, Melbourne, Australia.

Li, et al., "Efficient Batched Synchronization in Dropbox-like Cloud Storage Services", retrieved Oct. 25, 2013, pp. 20, <<https://www.cs.ucsb.edu/~ravenben/publications/pdf/dropbox-middleware13.pdf>>.

Li, et al., "Making Geo-Replicated Systems Fast as Possible, Consistent when Necessary", Proceedings of the 10th USENIX

(56) References Cited

OTHER PUBLICATIONS

Conference on Operating Systems Design and Implementation (OSDI '12), Oct. 8-10, 2012, pp. 265-278, USENIX Association, Hollywood, California.

Liebeherr, et al., "A System Theoretic Approach to Bandwidth Estimation", Institute of Electrical and Electronics Engineers (IEEE) / Association for Computing Machinery (ACM) Transactions on Networking (TON), Feb. 26, 2010, pp. 14, vol. 18 Issue 4, IEEE Press, Piscataway, New Jersey.

Ling, et al., "Session State: Beyond Soft State", Proceedings of the 1st Conference on Symposium on Networked Systems Design and Implementation (NSDI '04), Mar. 29-31, 2004, pp. 14, USENIX Association, San Francisco, California.

Lloyd, et al., "Don't Settle for Eventual: Scalable Causal Consistency for Wide-Area Storage with COPS", Proceedings of the 23rd Association for Computing Machinery (ACM) Symposium on Operating Systems Principles (SOSP '11), Oct. 23-26, 2011, pp. 1-16, ACM, Cascais, Portugal.

Microsoft Corporation, "Delta Compression Application Programming Interfaces", Oct. 2009, pp. 1-57, Microsoft Corporation, retrieved at <<http://msdn.microsoft.com/en-us/library/bb417345.aspx>>.

Mogul, et al., "Delta encoding in HTTP", Proposed Standard, Network Working Group, Request for Comments: 3229, Jan. 2002, pp. 1-50, Internet Engineering Task Force (IETF), retrieved at <<http://tools.ietf.org/html/rfc3229>>.

Neil, "Details of the Dec. 28, 2012 Windows Azure Storage Disruption in US South", MSDN Blogs > Windows Azure, Jan. 16, 2013, pp. 1-5, Microsoft Corporation, retrieved at <<http://blogs.msdn.com/b/windowsazure/archive/2013/01/16/details-of-the-december-28th-2012-windows-azure-storage-disruption-in-us-south.aspx>>.

Rajagopalan, et al., "SecondSite: Disaster Tolerance as a Service", Proceedings of the 8th Association for Computing Machinery (ACM) SIGPLAN/SIGOPS Conference on Virtual Execution Environments (VEE '12), Mar. 3-4, 2012, pp. 11, ACM, London, England.

Schneider, "Implementing Fault-Tolerant Services Using The State Machine Approach: A Tutorial", Association for Computing Machinery (ACM) Computing Surveys, Dec. 1990, pp. 299-319, vol. 22, No. 4, ACM, New York, New York.

Shankaranarayanan, et al., "D-Tunes: Self Tuning Datastores for Geo-distributed Interactive Applications", Proceedings of the Association for Computing Machinery (ACM) Special Interest Group on Data Communication (SIGCOMM) 2013 Conference (SIGCOMM '13), Aug. 12-16, 2013, pp. 483-484, ACM, Hong Kong, China.

Siewert, "Big data in the cloud", IBM developerWorks, Jul. 9, 2013, pp. 1-13, IBM Corporation, Armonk, New York.

Sommers, et al., "Cell vs. WiFi: On the Performance of Metro Area Mobile Connections", Proceedings of the 2012 Association for Computing Machinery (ACM) Conference on Internet Measurement Conference (IMC '12), Nov. 14-16, 2012, pp. 14, ACM, Boston, Massachusetts.

Vulimiri, et al., "More is Less: Reducing Latency via Redundancy", Proceedings of the 11th Association for Computing Machinery (ACM) Workshop on Hot Topics in Networks (Hotnets '12), Oct. 29-30, 2012, pp. 1-6, ACM, Seattle, Washington.

W3C, "Web Storage", W3C Recommendation, Jul. 30, 2013, pp. 1-21, W3C (World Wide Web Consortium), retrieved at <<http://www.w3.org/TR/webstorage/>>.

Wang, et al., "Cloud Mobile Gaming: Modeling and Measuring User Experience in Mobile Wireless Networks", Association for Computing Machinery (ACM) SIGMOBILE Mobile Computing and Communications Review, Jan. 2012, pp. 12, vol. 16 Issue 1, ACM, New York, New York.

Wang, et al., "Demystifying Page Load Performance with WProf", Proceedings of the 10th USENIX Conference on Networked Systems Design and Implementation (NSDI '13), Apr. 2-5, 2013, pp. 1-13, USENIX Association, Lombard, Illinois.

Weatherspoon, et al., "Smoke and Mirrors: Reflecting Files at a Geographically Remote Location Without Loss of Performance", 7th USENIX Conference on File and Storage Technologies (FAST '09), Feb. 24-27, 2009, pp. 211-224, USENIX Association.

Wei, et al., "Classification of Access Network Types: LAN, Wireless LAN, ADSL, Cable or Dialup?", Computer Networks: The International Journal of Computer and Telecommunications Networking, Dec. 2008, pp. 3205-3217, vol. 52 Issue 17, Elsevier North-Holland, Inc. New York, New York.

Willinger, et al., "A Pragmatic Approach to Dealing with High-Variability in Network Measurements", Proceedings of the 4th Association for Computing Machinery (ACM) SIGCOMM Conference on Internet Measurement (IMC '04), Oct. 25-27, 2004, pp. 13, ACM, Taormina, Sicily, Italy.

Wood, et al., "Disaster Recovery as a Cloud Service: Economic Benefits & Deployment Challenges", Proceedings of the 2nd USENIX Conference on Hot Topics in Cloud Computing (HotCloud '10), Jun. 22, 2010, pp. 7, USENIX Association, Boston, Massachusetts.

Wood, et al., "PipeCloud: Using Causality to Overcome Speed-of-Light Delays in Cloud-Based Disaster Recovery", Proceedings of the 2nd Association for Computing Machinery (ACM) Symposium on Cloud Computing (SOCC '11), Oct. 27-28, 2011, pp. 13, Article No. 17, ACM, Cascais, Portugal.

"International Search Report and Written Opinion Issued in PCT Application No. PCT/US2014/063614", dated Feb. 25, 2015, 10 Pages.

"First Office Action Issued in Chinese Patent Application No. 201480061769.2", dated Jul. 4, 2018, 16 Pages.

"Second Office Action Issued in Chinese Patent Application No. 201480061769.2", dated Mar. 5, 2019, 07 Pages.

"Office Action Issued in European Patent Application No. 14805405.9", dated Nov. 5, 2018, 05 Pages.

* cited by examiner

| Option No. | Session State Data Replication Option | Performance & Resource Cost Parameters |
|---|---|---|
| 1 | Session State Data Is Stored On Client Computing Device. Session State Data Is Added To Each Application Response Message Application Transmits To Client. Session State Data Is Added To Each Client Request Message Client Transmits To Application. | TC1, BC1, BATC1 |
| 2 | Session State Data Is Synchronously Stored In One Or More Backup Data Centers Whenever Session State Changes. Application Waits To Respond To Client Request Message Until Current Data Center Receives Confirmation Message Indicating Session State Data Was Successfully Stored In At Least One Backup Data Center. | TC2, BD2, SD2 |
| 3 | Encoded Version Of Session State Data Is Stored On Client Computing Device. Encoded Version Can Be Just User-Entered Data, Or Compressed Version Of All Session State Data. | TC3, BC3, BATC3, CD3 |
| 4 | Session State Data Is Stored On Client Computing Device. Session State Data Is Added To Each Application Response Message Application Transmits To Client. Client Detects Failure Of Current Data Center To Serve Session, And Then Transmits Session State Data To Backup Data Center. | TC4, BC4, BATC4 |
| 5 | Session State Data Is Asynchronously Stored In One Or More Backup Data Centers Whenever Session State Changes. Application Responds To Client Request Message Before Current Data Center Receives Confirmation Message Indicating Session State Data Was Successfully Stored In At Least One Backup Data Center. Client Waits For Confirmation From At Least One Backup Data Center Before Exposing Application Response To User. | TC5, BATC5, BD5, SD5 |
| 6 | Encrypted Version Of Session State Data Is Stored On Client Computing Device. | TC6, BC6, BATC6, CD6 |
| 7 | Any Combination Of Above Options | Various Combinations Of Above Parameters |

FIG. 2

GEO-DISTRIBUTED DISASTER RECOVERY FOR INTERACTIVE CLOUD APPLICATIONS

BACKGROUND

The Internet is a global data communications system that serves billions of users worldwide. The Internet provides users access to a vast array of online information resources and services, including those provided by the World Wide Web, intranet-based enterprises, and the like. Thanks to the ubiquity of the various types of personal computing devices that exist today (such as personal computers, laptop/notebook computers, smart phones and tablet computers) and the ubiquity of the Internet, an ever-growing number of users in an increasing number of geographic regions routinely use an ever-growing number of web applications in their everyday lives. For examples, users rely on web applications for emailing, texting, video conferencing, listening to music, watching movies, searching for online information, storing and accessing online information, and online shopping and banking. Web applications are commonly hosted on data centers.

SUMMARY

This Summary is provided to introduce a selection of concepts, in a simplified form, that are further described hereafter in the Detailed Description. This Summary is not intended to identify key features or essential features of the claimed subject matter, nor is it intended to be used as an aid in determining the scope of the claimed subject matter.

Geo-distributed disaster recovery technique embodiments described herein are generally applicable to ensuring the availability of an application that is being hosted on a current data center. In other words, the geo-distributed disaster recovery technique embodiments provide disaster recovery for the application. In one exemplary embodiment an option for replicating session state data for the application is selected, where this selection is made from a set of different session state data replication options each of which has different performance and resource cost trade-offs, and the selected option determines how the session state data for the application is to be replicated. The selected option is then implemented, where the implementation results in the session state data for the application being replicated outside of the current data center, thus ensuring that this data remains available in the event that the current data center goes offline.

In another exemplary embodiment a client computer receives a message from the current data center specifying an option for replicating session state data for the application that has been selected for the client computer, where this selection has been made from a set of different session state data replication options each of which has different performance and resource cost trade-offs, and the specified option determines how the session state data for the application is to be replicated. The specified option is then implemented, where the implementation results in the session state data for the application being replicated outside of the current data center, thus ensuring that this data remains available to the client computer in the event that the current data center goes offline.

Yet another exemplary embodiment involves provisioning and using spare data center capacity in a network of data centers. A determination is made as to an amount of spare server capacity that is to be added to each of the data centers in the network of data centers in order for this network to be able to take over the current application load of any one of the data centers if it fails. This determination is made by taking into account different factors that include one or more of: the total number of data centers, or the current server capacity of each of the data centers, or the geographic location of each of the data centers. It is then directed that the determined amount of spare server capacity be added to each of the data centers. Then, whenever any one of the data centers fails, the current application load of the failed data center is distributed across the spare server capacity that was added to each of the remaining data centers.

DESCRIPTION OF THE DRAWINGS

The specific features, aspects, and advantages of the geo-distributed disaster recovery technique embodiments described herein will become better understood with regard to the following description, appended claims, and accompanying drawings where:

FIG. 2 is a table summarizing different session state data replication options that can be used by the geo-distributed disaster recovery technique embodiments described herein and the performance and resource cost parameters that are associated with each of the replication options.

DETAILED DESCRIPTION

Figure 1:
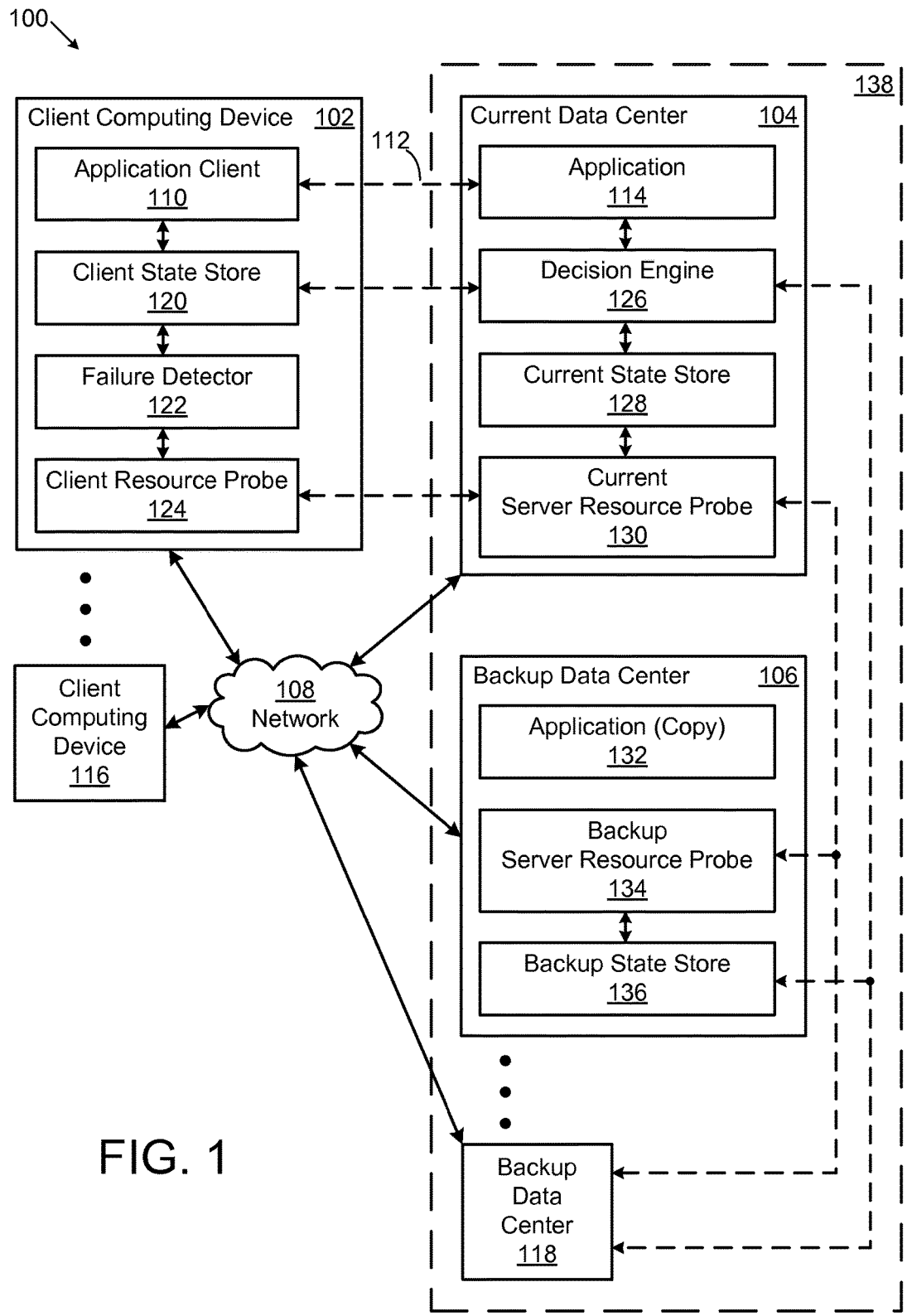
FIG. 1 is a diagram illustrating an exemplary embodiment, in simplified form, of an architectural framework for implementing the geo-distributed disaster recovery technique embodiments described herein.

In the following description of geo-distributed disaster recovery technique embodiments (hereafter simply referred to as disaster recovery technique embodiments) reference is made to the accompanying drawings which form a part hereof, and in which are shown, by way of illustration, specific embodiments in which the disaster recovery technique can be practiced. It is understood that other embodiments can be utilized and structural changes can be made without departing from the scope of the disaster recovery technique embodiments.

It is also noted that for the sake of clarity specific terminology will be resorted to in describing the disaster recovery technique embodiments described herein and it is not intended for these embodiments to be limited to the specific terms so chosen. Furthermore, it is to be understood that each specific term includes all its technical equivalents that operate in a broadly similar manner to achieve a similar purpose. Reference herein to "one embodiment", or "another embodiment", or an "exemplary embodiment", or an "alternate embodiment", or "one implementation", or "another implementation", or an "exemplary implementation", or an "alternate implementation" means that a particular feature, a particular structure, or particular characteristics described in connection with the embodiment or implementation can be included in at least one embodiment of the disaster recovery technique. The appearances of the phrases "in one embodiment", "in another embodiment", "in an exemplary embodiment", "in an alternate embodiment", "in one implementation", "in another implementation", "in an exemplary implementation", and "in an alternate implementation" in various places in the specification are not necessarily all referring to the same embodiment or implementation, nor are separate or alternative embodiments/implementations mutually exclusive of other embodiments/implementations. Yet furthermore, the order of process flow representing one or more embodiments or implementations of the disaster recovery technique does not inherently indicate any particular order not imply any limitations of the disaster recovery technique.

The term "cloud application" is used herein to refer to a web application that operates in the cloud and can be hosted on (e.g., deployed at) a plurality of data centers that can be located in different geographic regions (e.g., different regions of the world) and can be concurrently used by a plurality of remote end users (hereafter simply referred to as users). In other words, a cloud application is a web application that is geographically distributed. The term "client computing device" is used herein to refer to a computing device that a user uses to establish an interactive session with a given a given interactive cloud application.

1.0 Geo-Distributed Disaster Recovery for Interactive Cloud Applications

As is appreciated in the art of cloud computing, there is an emerging class of interactive cloud applications that are being rapidly developed and hosted on popular cloud platforms. Generally speaking, the disaster recovery technique embodiments described herein provide geo-distributed disaster recovery for such applications, while at the same time minimizing the performance costs (e.g., minimizing client latencies) and minimizing the resource costs (e.g., network bandwidth costs and data storage costs, among others) associated with providing this disaster recovery. In other words, the disaster recovery technique embodiments generally involve ensuring (e.g., maximizing) the availability of interactive cloud applications so that the applications and their most recent (e.g., freshest) state data remain available to users even if one or more of the data centers that host the applications go offline for whatever reason.

Generally speaking and as is appreciated in the art of web applications, there are two types of data that are associated with the overall state of a given interactive cloud application, namely session state data and persistent state data. Session state data is associated with an interactive session that one or more users establish with the application. It will be appreciated that the session state can change incrementally each time a user interacts with the application. Persistent state data has two properties that the session state data does not have namely durability and concurrency. The durability property of persistent state data refers to the fact that the persistent state data persists after all of the users have left the interactive session, and after the interactive session ends. In contrast, the session state data persists just for the life of the interactive session, and can be discarded once all of the users have left the interactive session. The concurrency property of persistent state data refers to the fact that a plurality of users and a plurality of interactive sessions can use the persistent state data at the same time. Many of the user's interactions with the application affect the session state data but do not affect the persistent state data.

As will be appreciated from the more detailed description that follows, all of the disaster recovery technique embodiments described herein focus specifically on replicating the session state data for an interactive session that takes place over a network between a given interactive cloud application and one or more client computing devices. However, some of the disaster recovery technique embodiments can also be used to replicate persistent state data for the application. The disaster recovery technique embodiments ensure that the most recent session state data will remain available to the client computing devices in the event that the data center that is currently hosting the application and serving the session goes offline and thus becomes unable to continue serving the session. As is appreciated in the art of cloud computing, various techniques exist for protecting the persistent state data in the event of a data center failure, one example of which is the conventional Paxos family of protocols. The fact that the disaster recovery technique embodiments treat the session state data separately from the persistent state data does not require significant modifications to existing web applications because such applications already preserve the session state explicitly between successive client requests by using a session state application programming interface (API) that is provided by the development platform for the web applications. The disaster recovery technique embodiments maintain consistency between the session state data and persistent state data since the embodiments store and will recover the most recent session state data whenever the data center that is currently serving the session goes offline for whatever reason, and thus becomes unable to continue serving the session.

As will be described in more detail hereafter, there are various performance and resource cost (e.g., resource utilization) trade-offs that are associated with ensuring the availability of interactive cloud applications. The disaster recovery technique embodiments allow developers of a given interactive cloud application to ensure the availability of the application to users by replicating the session state data for the application. As such, the session state data for interactive sessions with the application is protected against data center failures. As will be appreciated from the more detailed description that follows, the disaster recovery technique embodiments replicate the entire session state, including both user-entered data and server-computed data.

As will also be described in more detail hereafter, the disaster recovery technique embodiments provide a set of different options for replicating the session state data for the application, where each of the different session state data replication options has different performance and resource cost trade-offs. The disaster recovery technique embodiments also provide various methods for automatically selecting an appropriate one of the session state data replication options that increases (e.g., maximizes) the performance of a given interactive session with the application (and hence the performance that the users of the application experience) and/or decreases (e.g., minimizes) the resource costs (e.g., decreases the resources that are utilized) for the interactive session. This automatic selection is based on various performance constraints and resource cost constraints, and a prioritization thereof, that can be specified by the application. The disaster recovery technique embodiments can automatically switch from a previously selected session state data replication option to a newly selected session state data replication option in the middle of the interactive session based on changes in these constraints, or changes in their prioritization, or changes in prescribed run-time conditions in the computing and networking infrastructure that supports the application.

In other words, the disaster recovery technique embodiments automatically tune the performance and resource cost trade-offs that are associated with ensuring the availability of interactive cloud applications, and dynamically adapt this tuning (e.g., adapt the tuning on-the-fly) whenever the just-described prescribed run-time conditions change. Generally speaking and as will also be described in more detail hereafter, these run-time conditions can include, but are not limited to, various performance and resource costs such as network bandwidth costs, network latency experienced by client computing devices, data storage costs, processing costs, and battery energy drains costs, among others. The run-time conditions can also include, but are not limited to, various resource availabilities such as the current availability (e.g., percent utilization) of computing device processors, memory, and batteries, among others. Each of these run-time conditions can be different for different client and server computing devices in the infrastructure, and for different portions of the network in the infrastructure. Each of the run-time conditions can also change over time.

The disaster recovery technique embodiments described herein are advantageous for various reasons including, but not limited to, the following. As will be appreciated from the more detailed description that follows, the disaster recovery technique embodiments make interactive cloud applications resilient to data center failures by replicating the session state data for the applications. The disaster recovery technique embodiments minimize the computing and network transmission costs associated with this session state data replication so that the performance of interactive sessions with the applications is maximized, the user response times for the applications are minimized, and the resource costs for the data centers that host the applications are minimized. The disaster recovery technique embodiments also allow regional legal requirements to be met (e.g., current regulations in some countries dictate that some of the data that is served by a data center be located within national boundaries). The disaster recovery technique embodiments also integrate easily with existing cloud applications, in some cases without source code modifications. The disaster recovery technique embodiments automatically adapt to network bandwidth variations at the client computing devices (e.g., network bandwidth variations caused by either cellular or WiFi network signal strength fluctuations, or an Internet service provider's cable loop utilization, or DSL (digital subscriber line) network wire length variations, or edge network congestion (also known as last mile congestion), or the fact that mobile proxies may compress data sent to the client computing devices, or the like). The disaster recovery technique embodiments also automatically adapt to variable data center placements and transparently benefit cloud applications as new data centers are added to the cloud.

As described heretofore, an ever-growing number of users in an increasing number of geographic regions routinely use an ever-growing number of web applications in their everyday lives. This situation presents the data centers that host web applications with scalability challenges due to real world limitations on the capacity (e.g., storage size, computing power, network bandwidth, and power consumption) of the data centers. The disaster recovery technique embodiments described herein are further advantageous in that they provide usage scalability for interactive cloud applications (e.g., the disaster recovery technique embodiments ensure the availability of a given interactive cloud application even if a large number of users is using the application at the same time). The disaster recovery technique embodiments described herein also allow interactive sessions that take place over a network between interactive cloud applications and client computing devices to be served by nearby data centers. In other words, the disaster recovery technique embodiments ensure that the data center that is hosting a given interactive cloud application and currently serving a given interactive session between the application and a given client computing device will be close to the client computing device regardless of which geographic region the client computing device is in. This close proximity of the data center and client computing device reduces client latency and user response times.

It will be appreciated that a user of a given interactive cloud application is particularly sensitive to the performance of the application during the interactive phases of a session with the application. By way of example but not limitation, a user of an ecommerce website may want fast response time when browsing for products on the website, but may accept slower response times during the final stage of making a product purchase involving credit card verification. Once a user starts using the application (e.g., once the user enters a search request for a desired product name on an ecommerce website, or enters desired departure and destination cities and desired dates for a flight search on a travel website, or invites a friend to an online chat session, or the like), the disaster recovery technique embodiments described herein assume that an interactive session with the application has begun. Data that is relevant to the interactive session can be routinely generated by both the user and the application as the session progresses. By way of example but not limitation, once the flight search on the travel website has been completed, the website may have generated data about which available flights operate between the desired departure and destination cities on the desired dates. The user may have also entered filters for the flight search (e.g., the user may have requested to see just available flights that depart after 5:00 PM and have at most one stop, among other types of filters). At this point in the interactive session the session state data would include both the data that was entered by the user (e.g., the desired departure and destination cities, the desired dates, and the filters) and the data that was generated by the website in response to this user-entered data (e.g., which available flights operate between the desired departure and destination cities on the desired dates and comply with the filters).

The disaster recovery technique embodiments described herein ensure that the most recent session state data remains available to a given interactive cloud application even if the data center that is hosting the application and currently serving an interactive session over a network between the application and one or more client computing devices goes offline for any reason and another data center that is also hosting the application takes over serving the session. In other words, in the just-described example where the user is performing the flight search on the travel website, if the data center that is hosting the application and currently serving the interactive session with the user goes offline, the disaster recovery technique embodiments ensure that the other data center that takes over serving the session has access to the most recent session state data. Accordingly, the user will not have to re-enter any of data that they previously entered, and the other data center will not have to re-compute any of the data that was previously computed in response to the user-entered data. If the user then enters another filter that requests to see just the available flights that operate through a particular connecting airport, this other filter will be routed to the other data center, which will use the most recent session state data to generate new data for the user indicating which of the previously selected and filtered flights comply with this other filter.

1.1 Architectural Framework

FIG. 1 illustrates an exemplary embodiment, in simplified form, of an architectural framework for implementing the disaster recovery technique embodiments described herein. As exemplified in FIG. 1, the architectural framework 100 includes one or more client computing devices 102/116, a network 108, and the cloud 138. As is appreciated in the art of cloud computing, the cloud 138 generally includes a plurality of data centers (e.g., 104/106/118) that can be located in different geographic regions. The network 108 allows the client computing devices 102/116 to communicate with and exchange information with the data centers 104/106/118, and also allows the data centers to communicate with and exchange information with each other. It will be appreciated that the network 108 can employ a wide variety of local and wide area networking technologies. By way of example but not limitation, in an exemplary embodiment of the disaster recovery technique the network 108 is the Internet. Each of the client computing devices 102/116 can be any type of computing device. By way of example but not limitation, each of the client computing devices 102/116 can be either a mobile computing device (such as a smart-phone, or a tablet computer, or a personal digital assistant, or the like) or a non-mobile computing device (such as a desktop personal computer (PC), or a laptop computer, or the like).

As described heretofore and referring again to FIG. 1, users (not shown) can use the client computing devices 102/116 to establish an interactive session 112 with a desired interactive cloud application 114/132 (hereafter sometimes simply referred to as a cloud application, or sometimes even more simply referred to as an application) that can be hosted on the data centers 104/106/118. More particularly, when a given user who is using a given client computing device 102 wants to use a desired cloud application 114/132, various things happen including, but not limited to, the following. An application client 110 that is associated with the application 114/132 is run on the client computing device 102. One of the data centers 104 that is hosting the application 114 is selected to serve an interactive session 112 between the application and the application client 110. As exemplified in FIG. 1, the data center that is currently selected to serve the interactive session 112 is herein referred to as the current data center 104.

Referring again to FIG. 1, one or more other data centers 106/118 that host a copy of the application 132 are selected to serve the interactive session 112 in the event that the current data center 104 becomes unable to do so for whatever reason. It will be appreciated that the current data center 104 can become unable to continue serving the interactive session 112 for various reasons including, but not limited to, the following. The current data center 104 can go offline due to either a failure within the current data center or a failure in the network 108, or the current data can become overloaded. As exemplified in FIG. 1, the other data centers that are selected to serve the interactive session 112 in the event that the current data center 104 becomes unable to do so are herein referred to as backup data centers 106/118. The disaster recovery technique embodiments described herein assume that the copy of the application 132 that is hosted on the backup data centers 106/118 can provide the same functionality as the application 114 that is hosted on the current data center 104.

As is appreciated in the art of cloud computing and referring again to FIG. 1, each of the data centers 104/106/118 in the architectural framework 100 can include a plurality of server computing devices (not shown) which communicate over an internal network (not shown) in the data center. Generally speaking, large data centers include a large number of server computing devices, and small data centers include a small number of server computing devices. The disaster recovery technique embodiments described herein can be used in various framework 100 configurations ranging from a configuration that includes a small number of large data centers to a configuration that includes a large number of small data centers. In an exemplary embodiment of the disaster recovery technique the application 114 is run on one of the server computing devices in the current data center 104. In other words, the interactive session 112 that is taking place over the network 108 between the application 114 and the application client 110 is served by one of the server computing devices in the current data center 104. The server computing device in the current data center 104 that runs the application 114 and serves the interactive session 112 is hereafter simply referred to as an application server.

As is also appreciated in the art of cloud computing and referring again to FIG. 1, the selection of which one of the data centers 104/106/118 that hosts the application 114/132 will be the current data center 104, and which one or more of these data centers will be backup data centers 106/118, can be made dynamically (e.g., on-the-fly) using various conventional methods. By way of example but not limitation, this selection can be made by either a network of edge nodes (not shown) that is deployed for the application 114/132, or a content delivery network (also known as a content distribution network or CDN for short) (not shown), or by the application client 110 itself (as is the case when using a round robin Domain Name System). Regardless of the specific method that is used to select the current data center 104 and the backup data center(s) 106/118, the disaster recovery technique embodiments described herein assume that these selections have already been made. Once the current data center 104 and the backup data center(s) 106/118 have been selected, an interactive session 112 can be established over the network 108 between the application client 110 and the application 114 that is running in the current data center. The disaster recovery technique embodiments assume that this pre-selection of the current data center 104 and the backup data center(s) 106/118 is known for each interactive session 112.

Referring again to FIG. 1, if the current data center 104 goes offline at a time when there are a plurality of backup data centers 106/118 in operation, the determination of which of the backup data centers will be selected to become the new current data center for each existing and new interactive session 112 can be made in various ways. By way of example but not limitation, in one embodiment of the disaster recovery technique described herein this selection can be made based on static provisioning decisions (e.g., if two backup data centers 106 and 118 are currently in operation, one of these backup data centers 106 can take over serving one half of the existing and new interactive sessions 112, and the other of these backup data centers 118 can take over serving the other half of the existing and new interactive sessions). In another embodiment of the disaster recovery technique this selection can be made based on the current load conditions in each of the backup data centers 106/118 when the interactive session 112 is first established.

Referring again to FIG. 1, it is noted that during the interactive session 112, application-related messages are exchanged over the network 108 just between the application client 110 that is running on the client computing device 102 and the application 114 that is running in the current data center 104. In other words, no application-related messages are exchanged between the current data center 104 and the backup data centers 106/118. As will be appreciated from the more detailed description that follows and as exemplified in FIG. 1, in addition to the application-related messages, the various additional program modules that are described in more detail hereafter can exchange various other types of information over the network 108 between the client computing devices 102/116 and the current data center 104, and between the current data center and the backup data centers 106/118. These particular information exchanges are hereafter simply referred to as disaster recovery information exchanges.

It will be appreciated that the just-described disaster recovery information exchanges can be implemented in various ways. By way of example but not limitation, in instances where a given disaster recovery information exchange is to take place between a given client computing device (e.g., 102) and the current data center 104, the disaster recovery information exchange can be piggybacked on (e.g., included within) a given application-related message that is to be exchanged over the network 108 between the client computing device and the current data center. In instances where a given disaster recovery information exchange is to take place between the current data center 104 and a given backup data center (e.g., 106), the disaster recovery information exchange can be implemented by the additional program modules transmitting their own messages over the network 108 which are independent of the application-related messages. It is also possible for disaster recovery information exchanges between a given client computing device (e.g., 102) and the current data center 104 to be implemented by the additional program modules transmitting their own messages over the network 108 which are independent of the application-related messages.

Referring again to FIG. 1, in addition to the application client 110, various additional program modules can be run on each of the client computing devices 102/116. As exemplified in FIG. 1, these additional program modules include, but are not limited to, a client state store module 120, a failure detector module 122, and a client resource probe module 124. Exemplary functions of each of these additional program modules 120/122/124 are described in more detail hereafter. As will be appreciated from the more detailed description of the different session state data replication options that also follows, some of these options necessitate the use of all of the additional program modules 120/122/124, and others of these options necessitate the use of just a subset of the additional program modules. Hence, some of the client computing devices 102/116 may be running all of the additional program modules 120/122/124 while other client computing devices may be running just a subset of the additional program modules. The particular session state data replication option that is currently selected and being implemented for a given client computing device (e.g., 102) determines which of the additional program modules 120/122/124 are running on the client computing device at a given point in time.

Referring again to FIG. 1, the client state store module 120 stores session state data for the interactive session 112 on the client computing device 102 for the session state data replication options that involve storing the session state data on the client computing device. In other words, the client state store module inputs a data object (not shown) that includes the most recent session state data and stores it on the client computing device 102. The client state store module can also retrieve and output this stored data object whenever the application client 110 requests it. The client state store module thus ensures that the most recent session state data remains available to the application client as long as the client computing device is available (e.g., remains functional).

Referring again to FIG. 1, the client state store module 120 can be implemented in various ways. By way of example but not limitation, in one embodiment of the disaster recovery technique described herein the client state store module can use the cookie mechanism that is offered by conventional web browsers to store data on the client computing device 102. In another embodiment of the disaster recovery technique the client state store module can use a JavaScript program that stores the data object on the client computing device in either volatile memory or various types of non-volatile memory (e.g., persistent storage) that may be available on the client computing device. Examples of such non-volatile memory include, but are not limited to magnetic disk storage and flash memory. It will be appreciated that storing the most recent session state data in volatile memory on the client computing device is not problematic since, as described heretofore, the session state data persists just for the life of the interactive session, and can be discarded once the application client 110 has left the interactive session. In yet another embodiment of the disaster recovery technique the client state store module can use the conventional web storage APIs that are supported by today's web browser applications to write the most recent session state data to secondary storage such as a blob storage element in the cloud 138. This particular embodiment is advantageous in that it minimizes memory overhead on the client computing device.

Referring again to FIG. 1 and as will be described in more detail hereafter, the failure detector module 122 operates when the session state data for the interactive session 112 is being replicated using a fourth one of the different session state data replication options. Generally speaking, the failure detector module operates in two phases, namely a failure detection phase and a subsequent recovery phase. As will be appreciated from the more detailed description that follows, the features of the failure detector module are advantageous in that they minimize the time it takes to recover from the current data center 104 going offline. The disaster recovery technique embodiments described herein assume a conventional fail-stop failure model for the various data centers 104/106/118 in the cloud 138. As is appreciated in the art of distributed computing, due to the well-known Impossibility of Distributed Consensus with One Faulty Process (also known as the "FLP result" and the "FLP impossibility proof"), a distributed failure detector has to choose between completeness (e.g., every failure is eventually detected) and accuracy (e.g., false positives). The disaster recovery technique embodiments described herein provide a failure detection solution that is fast and ensures completeness, but does not necessarily ensure accuracy. It is noted that alternate embodiments of the disaster recovery technique are possible that are more complex but can ensure both completeness and accuracy.

During the failure detection phase the failure detector module 122 detects when the current data center 104 that is serving the interactive session 112 goes offline and thus becomes unable to continue serving the session. The failure detector module can be implemented in various ways. By way of example but not limitation, in one embodiment of the disaster recovery technique described herein the failure detector module can use a timer to measure the time that has elapsed since the application client 110 last submitted a client request message over the network 108 to the application 114. If the application client does not receive an application response to the client request message within a prescribed period of time, then the failure detector module can assume that the current data center has failed and gone offline (although it will be appreciated that the actual failure that resulted in the current data center's inability to respond could be somewhere in the network or elsewhere). In another embodiment of the disaster recovery technique the failure detector module can periodically transmit a test message over the network to the current data center and receive a test response message therefrom that indicates the current availability thereof (e.g., this test response message may indicate that the current data center is either fully available, or is currently getting overloaded and hence may not be available in the near future, or is currently operating from battery backup power and hence may fail in the near future, among other things). In yet another embodiment of the disaster recovery technique, whenever the failure detector module detects a failure of the current data center that results in it being currently unable to serve the interactive session, the failure detector module can periodically test the availability of the network at the client computing device 102 using a mechanism that is independent of the current data center, and the failure detector module can use this network availability information to enhance its knowledge about why the current data center is currently unable to serve the interactive session.

Referring again to FIG. 1, once the failure detection phase is complete, the recovery phase is started by the application client 110 transmitting a session resume request message over the network 108 to a backup data center (e.g., 106) that has been selected to take over serving the interactive session 112, where this message includes the most recent session state data for the interactive session that is stored on the client computing device 102. When the selected backup data center receives this session resume request message from the application client, the selected backup data center will extract the most recent session state data from the message and provide it to the copy of the application 132 so that the interactive session 112 can be resumed.

It will be appreciated that after the current data center goes offline, the application is paused until the most recent session state data has been recovered and the interactive session has been resumed at the selected backup data center. This pausing of the application can make the user think that the application has frozen. In order to minimize the user's frustration and prevent them from thinking that the application has frozen, after the failure detector module detects that the current data center has gone offline the failure detector module can optionally inform the application client that the current data center has gone offline, and the application client can optionally display a message to the user telling them about this and that a wait is expected until the interactive session is resumed. Once the recovery phase has been successfully completed and the interactive session has been resumed at a backup data center, the application client can optionally display another message to the user telling them that the application is once again available for use.

Generally speaking and referring again to FIG. 1, the client resource probe module 124 operates cooperatively with a current server resource probe module 130 that is running on the current data center 104 to periodically measure relevant network performance conditions and resource availability conditions at the client computing device 102. A decision engine module 126 that is also running on the current data center 104 can use these measured conditions, along with other measured conditions described herein, to select an appropriate session state data replication option. More particularly and by way of example but not limitation, in one embodiment of the disaster recovery technique described herein the client resource probe module 124 can receive server probe messages that are periodically sent to the client resource probe module by the current server resource probe module 130, and can immediately respond to each of these messages. The current server resource probe module 130 can measure the current network latency associated with communicating with the client computing device 102 (e.g., the current network round trip time for the current data center 104 to reach the client computing device) simply by measuring the time between when the server resource probe module transmits each server probe message over the network 108 to the client resource probe module 124, and when the server resource probe module receives a response to the server probe message from the client resource probe module. This measurement provides an estimate of the current network latency at zero payload. It will be appreciated that since each server probe message has a very tiny payload, the network 108 overhead associated with the server probe messages and their associated responses is negligible.

Referring again to FIG. 1, in another embodiment of the disaster recovery technique described herein the client resource probe module 124 can periodically measure the current network latency associated with communicating with the current data center 104 and transmit this network latency measurement to the current data center. The client resource probe module can also periodically measure the current network bandwidth that is available to the client computing device 102 and transmit this network bandwidth measurement to the current data center. The client resource probe module can also periodically measure the current availability of one or more resources in the client computing device (including, but not limited to, its current battery availability (e.g., percent utilization), its current processor availability, and its current memory availability) and transmit these resource availability measurements to the current data center.

Referring again to FIG. 1, the client resource probe module 124 can be implemented in various ways using various mechanisms that are available on the client computing device 102. By way of example but not limitation, in one embodiment of the disaster recovery technique described herein the client resource probe module can periodically measure the current network latency associated with communicating with the current data center 104, and the current network bandwidth that is available to the client computing device, simply by measuring the time between when the application client 110 transmits each client request message over the network 108 to the application 114, and when the application client receives an application response to the client request message from the application. In another embodiment of the disaster recovery technique the client resource probe module can periodically transmit a client probe message over the network to the current data center, and then use a received probe response message from the current data center to determine the current network latency associated with communicating with the current data center, and the current network bandwidth that is available to the client computing device. In yet another embodiment of the disaster recovery technique the client resource probe module can use one or more APIs that may exist in the operating system of the client computing device to determine the current availability of the just-described resources in the client computing device. It will be appreciated that there may be times when it may not be possible to measure certain resources in the client computing device (e.g., when the application client is a webpage that is running in a web browser, the application client may not be allowed to make certain resource measurements).

Referring again to FIG. 1, in addition to the application 114, various additional program modules can be run in the current data center 104. As exemplified in FIG. 1, these additional program modules include, but are not limited to, a decision engine module 126, a current state store module 128, and a current server resource probe module 130. Exemplary functions of each of these additional program modules 126/128/130 are described in more detail hereafter. In an exemplary embodiment of the disaster recovery technique described herein, the decision engine and current state store modules 126 and 128 can be run either on the application server (not shown), or on another server computing device in the current data center 104. The current server resource probe module 130 is generally run on the application server.

Generally speaking and referring again to FIG. 1, the current server resource probe module 130 operates cooperatively with both the client resource probe module 124 and a backup server resource probe module 134 that is running on each of the backup data centers 106/118 to periodically measure relevant network performance conditions and resource availability conditions at the application server in the current data center 104. The current server resource probe module 130 transmits these measurements to the decision engine module 126. The decision engine module 126 can use these measured conditions, along with other measured conditions described herein, to select an appropriate session state data replication option. More particularly and by way of example but not limitation, the current server resource probe module 130 can periodically measure the current network latency associated with communicating with the client computing device 102, and the current network bandwidth that is available to the client computing device. In an exemplary embodiment of the disaster recovery technique described herein these current network latency and current network bandwidth measurements can be made by the current server resource probe module 130 periodically transmitting a server probe message over the network 108 to the client computing device 102, and then using a received probe response message from the client computing device to determine the current network latency associated with communicating with the client computing device, and the current network bandwidth that is available to the client computing device. The current server resource probe module 130 can also periodically measure the current network latency associated with communicating with each of the backup data centers 106/118, and the current network bandwidth that is available to each of the backup data centers. In an exemplary embodiment of the disaster recovery technique these current network latency and current network bandwidth measurements can be made by the current server resource probe module 130 periodically transmitting a server probe message over the network 108 to each of the backup data centers 106/118, and then using a received probe response message from each of the backup data centers to determine the current network latency associated with communicating with each of the backup data centers, and the current network bandwidth that is available to each of the backup data centers.

Referring again to FIG. 1, the current server resource probe module 130 can also periodically measure the current availability of one or more resources in the application server including, but not limited to, its current processor availability and its current memory availability. It will be appreciated that the current server resource probe module can make these resource availability measurements in various ways using various mechanisms that are available on the application server. By way of example but not limitation, the current server resource probe module can use one or more APIs that may exist in the operating system of the application server to determine the current availability of the just-described resources in the application server. The current server resource probe module can also include functionality that the client resource probe module 124 can use to measure the current network bandwidth that is available to the client computing device 102. By way of example but not limitation, upon receiving the aforementioned client probe message over the network 108 from the client resource probe module, the current server resource probe module can respond to the client probe message by transmitting a data payload over the network to the client resource probe module. The client resource probe module can measure the time it take to receive the data payload, and can then use this time and the size of the payload to calculate the current network bandwidth that is available to the client computing device.

Referring again to FIG. 1, the decision engine module 126 periodically receives information over the network 108 from the client resource probe module 124, where this information includes the most recent network performance and resource availability measurements the client resource probe module has made at the client computing device 102. The decision engine module 126 also periodically receives information from the current server resource probe module 130, where this information includes the most recent performance and resource availability measurements the current server resource probe module has made at the application server in the current data center 104. The decision engine module 126 also receives the aforementioned various performance constraints and resource cost constraints, and a prioritization thereof, that can be specified by the application 114. Exemplary performance constraints that can be specified by the application include, but are not limited to, either a maximum allowable latency cost to the client computing device 102 associated with replicating the session state data, or a minimum allowable availability value for the application 114/132, or both this maximum allowable latency cost and this minimum allowable availability value. Exemplary resource costs and related constraints that can be specified by the application are described in more detail hereafter. The decision engine module 126 then selects an appropriate option for replicating the session state data for the interactive session 112 with the application 114 that increases the performance of the interactive session and/or decreases the resource costs for the interactive session. As will be described in more detail hereafter, this selection is made from a set of different session state data replication options each of which has different performance and resource cost tradeoffs, and can be based on the just-described constraints and their priorities. In other words, the decision engine module 126 determines how the session state data for the application 114 will be stored and replicated in the framework 100. The decision engine module 126 can use various methods to make this selection, examples of which are described in more detail hereafter.

Referring again to FIG. 1, in an exemplary embodiment of the disaster recovery technique described herein, after an appropriate session state data replication option has been selected by the decision engine module 126 and implemented, the decision engine module can monitor the information it receives from the client and current server resource probe modules 124 and 130 on an ongoing basis. The decision engine module 126 can also monitor the various performance constraints and resource cost constraints, and the prioritization thereof, that can be specified by the application 114 on an ongoing basis. Whenever the decision engine module 126 detects changes in this received information, or in these constraints or their priorities, the decision engine module can again select an appropriate one of the session state data replication options that increases the performance of the interactive session 112 with the application 114 and/or decreases the resource costs for the interactive session, where this newly selected option can be either the same as or different than the previously selected option.

Referring again to FIG. 1, the current state store module 128 stores the session state data for the interactive session 112 in the current data center 104 for the session state data replication options that involve storing the session state data in the current data center. In other words, the current state store module 128 inputs a data object (not shown) that includes the most recent session state data and stores it in the current data center 104. The current state store module 128 can also retrieve and output this stored data object whenever the application 114 requests it. The current state store module 128 thus ensures that the most recent session state data remains available while the interactive session 112 is active and as long as the current data center 104 is available. The current state store module 128 can store the data object in the current data center 104 in various ways. By way of example but not limitation, in one embodiment of the disaster recovery technique described herein the current state store module 128 can store the data object in either volatile memory or various types of non-volatile memory (e.g., magnetic disk storage, or the like) that may be available in the current data center 104. The current state store module 128 can also store the data object redundantly in the current data center 104 to protect against server failures there-within.

As exemplified in FIG. 1, each of the backup data centers 106/118 hosts a copy of the application 132. In the event that the current data center 104 becomes unable to serve the interactive session 112 for whatever reason, one of the backup data centers (e.g., 106) will be automatically selected to take-over serving the interactive session. When this take-over occurs, in an exemplary embodiment of the disaster recovery technique described herein the copy of the application 132 will be run on one of the server computing devices in the selected backup data center 106 and the interactive session 112 will resume over the network 108 between this copy of the application and the application client 110. It is noted that until such a take-over occurs, the copy of the application 132 remains unused. The server computing device in the selected backup data center 106 that runs the copy of the application 132 and takes over serving the interactive session 112 is hereafter simply referred to as a backup application server.

Referring again to FIG. 1, in addition to the copy of the application 132, various additional program modules can be run on each of the backup data centers 106/118. As exemplified in FIG. 1, these additional program modules include, but not limited to, the aforementioned backup server resource probe module 134 and a backup state store module 136. Exemplary functions of each of these additional program modules 134/136 are described in more detail hereafter. In an exemplary embodiment of the disaster recovery technique described herein, the backup state store module 136 is run either on the backup application server (not shown), or on another server computing device in the selected backup data center 106. The backup server resource probe module 134 is generally run on the backup application server.

Referring again to FIG. 1, the backup state store module 136 receives the most recent session state data for the interactive session 112 from the current data center 104 and stores this received session state data in the backup data center 106 for the session state data replication options that involve storing the session state data in the backup data center. In other words, the backup state store module 136 inputs a data object (not shown) that includes the received session state data and stores it in the backup data center 106. The backup state store module 136 can also retrieve and output this stored data object whenever the copy of the application 132 requests it. The backup state store module 136 thus ensures that the session state data remains available while the interactive session 112 is active and as long as the backup data center 106 is available. The backup state store module 136 can store the data object in the backup data center 106 in various ways. By way of example but not limitation, in one embodiment of the disaster recovery technique described herein the backup state store module 136 can store the data object in either volatile memory or various types of non-volatile memory that may be available in the backup data center 106. In another embodiment of the disaster recovery technique the backup state store module 136 can write the data object to secondary storage such as a blob storage element which can be located either within the backup data center 106 or elsewhere in the cloud 138. This particular embodiment is advantageous in that it enhanced scalability and minimizes memory overhead. The backup state store module 136 can also store the data object redundantly in the backup data center 106 to protect against server failures there-within. It will be appreciated that the backup state store module 136 can store session state data for a plurality of interactive sessions that are served by the current data center 104.

Generally speaking and referring again to FIG. 1, the backup server resource probe module 134 implements remote endpoint functionality that operates cooperatively with the current server resource probe module 130 and supports its aforementioned periodic measurement of the current network latency associated with communicating with the backup data center 106, and the current network bandwidth that is available to the backup data center 106. More particularly and by way of example but not limitation, the backup server resource probe module 134 can receive the server probe messages that are periodically sent by the current server resource probe module 130, and can immediately respond to each of these messages. Upon the current server resource probe module 130 receiving a probe response message from the backup server resource probe module 134, the current server resource probe module can determine the current network latency associated with communicating with the backup data center 106 by measuring the time between when each of the server probe messages is sent and when the corresponding probe response message is received (e.g., by measuring the current round trip network delay between the current data center 104 and the backup data center 106).

Given the foregoing and referring again to FIG. 1, it will be appreciated that the replication of session state data that is provided for by the disaster recovery technique embodiments described herein ensures that the session state data for the application 114/132 remains available to the application client 110 (e.g., none of the session state data is lost) in the event that the current data center 104 goes offline for whatever reason, and thus becomes unable to continue serving the interactive session 112. As described heretofore, the disaster recovery technique embodiments replicate and thus protect the entire session state, including both user-entered data and server-computed data. Accordingly, the disaster recovery technique embodiments allow the entire state of the interactive session that is taking place between the application client and the application to be maintained, even if the current data center goes offline and one of the backup data centers 106/118 takes over serving the interactive session. As such, if the current data center were to go offline for whatever reason, none of the session state data would have to be re-entered by the user or re-computed by the backup data centers.

Although the disaster recovery technique embodiments described herein are discussed in the context of an interactive session being established between a given cloud application and a single client computing device that is being used by a single user, it is noted that the disaster recovery technique embodiments also support interactive sessions with cloud applications that include a plurality of users and a plurality of client computing devices which are jointly participating in the interactive session, and which may be located in different geographic regions. In other words, the disaster recovery technique embodiments support a situation where just a single application client is participating in an interactive session. The disaster recovery technique embodiments also support a situation where a plurality of application clients running on different client computing devices is collaboratively participating in a common interactive session at the same time (examples of such a situation include a plurality of geographically distributed users collaboratively playing a multi-player online game, or collaboratively participating in an online video teleconference, or collaboratively editing an online document, or collaboratively using a given enterprise application, among others). As will be appreciated from the more detailed description that follows, in such a multi-client interactive session the disaster recovery technique embodiments can select different session state data replication options for different ones of the application clients that are participating in the session depending on the individual network performance conditions and resource availability conditions at the client computing devices. Additionally, in such a multi-client interactive session any one or more of the application clients can leave at any time during the session, and the disaster recovery technique embodiments will ensure that the session continues correctly for the remaining application clients.

Additionally, although the disaster recovery technique embodiments are discussed herein in the context of a given cloud application serving a single interactive session, it is noted that the disaster recovery technique embodiments also support a scenario where the application is serving a plurality of interactive sessions at the same time. In such a scenario the disaster recovery technique embodiments are implemented independently for each of the interactive sessions that is being served by the application.

1.2 Generic Libraries

Generally speaking, this section describes various embodiments of the disaster recovery technique described herein where the aforementioned additional program modules that can be run on the client computing devices, the current data center, and the backup data centers can be implemented as generic libraries (not shown). The disaster recovery technique embodiments described in this section are hereafter simply referred to as generic libraries embodiments of the disaster recovery technique described herein. The generic libraries embodiments of the disaster recovery technique automatically resume an active interactive session with a cloud application at a backup data center and recover the most recent session state data in the event that the current data center goes offline for whatever reason. The generic libraries embodiments support both request-response based Hyper Text Transfer Protocol (HTTP) cloud applications and continuous interaction based web-sockets cloud applications. The generic libraries embodiments override the existing session state APIs in the cloud application and the existing communication APIs in its application client.

In an exemplary implementation of the generic libraries embodiments of the disaster recovery technique described herein, each of the generic libraries sits just below the application layer in the network stack. Accordingly, interactions with the application that would normally occur through HTTP or web-sockets will occur through the generic libraries. In other words, the generic libraries intercept the HTTP and web-socket methods that applications use to communicate over the network, and add additional information (that is used to support the disaster recovery technique embodiments described herein) to application messages before they are transmitted over the network. Examples of such additional information include backup data center addresses and session state timestamps, among other types of information. In an exemplary implementation of the generic libraries embodiments this additional information is added to the application messages using JSON (JavaScript Object Notation) encoding. When the messages are received on the other end of the network, the additional information is removed by the generic libraries before the messages are passed to the application.

As will be appreciated from the more detailed description that follows, the generic libraries embodiments of the disaster recovery technique are advantageous for various reasons including, but not limited to, the following. The generic libraries embodiments allow the additional program modules to be easily integrated with existing cloud applications without having to make significant code modifications thereto. The generic libraries embodiments also allow the cloud application developers to benefit from the functionality of the additional program modules without having to understand the details of their underlying implementation. The generic libraries embodiments also allow each of the additional program modules to operate in an application independent manner such that a given additional program module can be shared by different application clients or different cloud applications. The generic libraries embodiments thus eliminate the need for each different application that is hosted on the current data center to separately implement the decision engine module, the current state store module, and the current server resource probe module. The generic libraries embodiments also eliminate the need for each different copy of the application that is hosted on each backup data center to separately implement the backup server resource probe module and the backup state store module. The generic libraries embodiments also eliminate the need for each different application client that is run on each client computing device to separately implement the client state store module, the failure detector module, and the client resource probe module.

More particularly and referring again to FIG. 1, the decision engine module 126 can be implemented as a generic library that is run on the current data center 104 and is shared by all of the different cloud applications (e.g., 114) that are hosted on the current data center. This particular generic library is hereafter simply referred to as a replication option selection library. All of the applications that are hosted on the current data center can input their performance constraints and resource cost constraints, and their prioritizations thereof, to the replication option selection library. For each of the applications that is hosted on the current data center, the replication option selection library can then use the application's constraints, and it's priorities thereof, to independently select the optimal session state data replication option for each of the interactive sessions (e.g., 112) that either is currently taking place, or might take place in the future, with the application. It will be appreciated that implementing the decision engine module as a generic library is particularly well-suited to cloud computing scenarios, virtualized server scenarios, and other scenarios where a plurality of applications are being hosted on the same data center. In these scenarios the current data center can serve a large number of interactive sessions with a large number of applications, and the replication option selection library can be shared amongst all of the sessions and applications.

Referring again to FIG. 1, the current state store and current server resource probe modules 128 and 130 can be implemented as another generic library that is run on the current data center 104 and is shared by the various cloud applications (e.g., 114) that are hosted on the current data center. The backup state store and backup server resource probe modules 136 and 134 can be implemented as yet another generic library that is run on each of the backup data centers 106/118 and is shared by the various cloud applications.

Referring again to FIG. 1, the client state store, failure detector and client resource probe modules 120/122/124 can be implemented as yet another generic library that each application client 110 can include in its implementation. By way of example but not limitation, for web-browser-based applications that run as webpages on the client computing devices 102/116 this library can be implemented in the form of a JavaScript program (which is advantageous since JavaScript programs are supported by most web browsers). For other types of applications, this library can be implemented in various platform-specific forms (e.g., on client computing devices that run a Windows® (a registered trademark of Microsoft Corporation) operating system, this library might be implemented in the form of a .NET DLL (dynamic link library). It will be appreciated that both of these generic library implementations are advantageous in that they produce a generic library that is portable across a wide variety of client platforms.

1.3 Session State Data Replication Options

Referring again to FIG. 1, this section provides a more detailed description of the different session state data replication options that can be used by the disaster recovery technique embodiments described herein. In other words, this section provides a more detailed description of different options for replicating the session state data for the interactive session 112 that is taking place over the network 108 between the application 114 and the application client 110. As stated heretofore and as will be further appreciated from the more detailed description that follows, each of the different session state data replication options has different performance and resource cost trade-offs. Generally speaking and as will be described in more detail hereafter, TCn is a cost parameter denoting a latency cost to the client computing device that is associated with a given replication option n. BCn is another cost parameter denoting a network bandwidth cost to the client computing device that is associated with the replication option n. BATCn is yet another cost parameter denoting a battery energy drain cost to the client computing device that is associated with the replication option n. BDn is yet another cost parameter denoting a network bandwidth cost to the current data center that is associated with the replication option n. As is appreciated in the art of cloud computing, cloud service providers often charge a given cloud application that they are hosting when data that is associated with the application leaves the data center that is hosting the application (such as when the current data center transmits session state data to a client computing device, or to a backup data center). SDn is yet another cost parameter denoting a data storage cost to the current data center that is associated with the replication option n. CDn is yet another cost parameter denoting a processing cost to the current data center that is associated with the replication option n.

FIG. 2 summarizes the different session state data replication options that can be used by the disaster recovery technique embodiments described herein and the performance and resource cost parameters (hereafter simply referred to as cost parameters) that are associated with each of the replication options. Each of the session state data replication options and its associated cost parameters are described in more detail hereafter.

The first of the session state data replication options exemplified in FIG. 2 involves storing the most recent session state data for the interactive session on the client computing device. This particular option is hereafter simply referred to as replication option 1. Generally speaking and as will now be described in more detail, in replication option 1 the most recent session state data for the interactive session is added to each application response message that the application transmits over the network to the application client. Upon the application client receiving a given application response message, the application client will extract the most recent session state data from the application response message, and the client state store module will store this extracted data on the client computing device as described heretofore. The most recent session state data for the interactive session is also added to each of the client request messages that the application client transmits over the network to the application.

In one embodiment of replication option 1 the application will add the entire set of most recent session state data to each application response message that the application transmits over the network to the application client. As such each application response message that the application client receives from the application will include the entire set of most recent session state data. The application client will also add the entire set of most recent session state data to each client request message that the application client transmits over the network to the application. As such, each client request message that the application receives from the application client will include the entire set of most recent session state data. Accordingly, in the event that the current data center goes offline and a given client request message from the application client is diverted to the backup data center, the copy of the application that receives the client request message will have the entire set of most recent session state data since it is included in the client request message.

In another embodiment of replication option 1, rather than the entire set of most recent session state data being added to each application response message that the application transmits to the application client, the application will add the entire set of most recent session state data to the first application response message that the application it transmits to the application client, and to every Nth application response message thereafter that the application transmits to the application client (N being a first prescribed number greater than one). Similarly, rather than the entire set of most recent session state data being added to each client request message that the application client transmits to the application, the application client will add the entire set of most recent session state data to the first client request message that the application client transmits to the application, and to every Mth client request message thereafter that the application client transmits to the application (M being a second prescribed number greater than one). It will be appreciated that either N can be equal to M, or N can be greater than M, or N can be less than M. By way of example but not limitation, when N=M=3, the entire set of session state data will be added to the first application response message that the application transmits to the application client and every third application response message thereafter. Similarly, the entire set of session state data will be added to the first client request message that the application client transmits to the application and every third client request message thereafter.

In yet another embodiment of replication option 1, rather than the entire set of most recent session state data being added to each application response message that the application transmits to the application client, the application will add the entire set of most recent session state data to the first application response message that the application transmits to the application client, and the application will add just the delta in (e.g., just the modified portions of) the session state data to each application response message thereafter that the application transmits to the application client (e.g., the application will add to each application response message after the first response message just the changes in the session state data since it was last transmitted to the application client). Similarly, rather than the entire set of most recent session state data being added to each client request message that the application client transmits to the application, the application client will add the entire set of most recent session state data to the first client request message that the application client transmits to the application, and the application client will add just the delta in the session state data to each client request message thereafter that the application client transmits to the application (e.g., the application client will add to each client request message after the first client request message just the changes in the session state data since it was last transmitted to the application).

In yet another embodiment of replication option 1, rather than the entire set of most recent session state data being added to each application response message that the application transmits to the application client, the application will add the entire set of most recent session state data to the first application response message that the application transmits to the application client, and the application will add just the delta in the session state data to every Nth application response message thereafter that the application transmits to the application client. Similarly, rather than the entire set of most recent session state data being added to each client request message that the application client transmits to the application, the application client will add the entire set of most recent session state data to the first client request message that the application client transmits to the application, and the application client will add just the delta in the session state data to every Mth client request message thereafter that the application client transmits to the application. By way of example but not limitation, when N=M=3, the entire set of session state data will be added to the first application response message that the application transmits to the application client, and just the delta in the session state data will be added to every third application response message thereafter that the application transmits to the application client. Similarly, the entire set of session state data will be added to the first client request message that the application client transmits to the application, and just the delta in the session state data will be added to every third client request message thereafter that the application client transmits to the application.

It will be appreciated that the most recent session state data can be added to the client request messages that the application client transmits over the network to the application, and the application response messages that the application transmits over the network to the application client, in various ways. By way of example but not limitation, in one embodiment of the disaster recovery technique described herein the most recent session state data can be added in the form of a cookie. In another embodiment of the disaster recovery technique the most recent session state data can be added into the body of each client request message and each application response message. An alternate embodiment of the disaster recovery technique is also possible where, rather than adding the most recent session state data to the client request and application response messages, the application client can transmit hidden messages that include the most recent session state data to the application, and the application can transmit similar hidden messages to the application client.

Generally speaking, replication option 1 has certain performance and resource costs that in certain circumstances can make it undesirable compared to others of the session state data replication options exemplified in FIG. 2. More particularly, if the session state data is large (e.g., in the aforementioned example where a user is performing a flight search on a travel website, the session state data may include all of the available flights that meet the search criteria entered by the user thus far), then including the sessions state data in each request message that the application client transmits over the network to the application will slow down the client (and thus negatively impact the client's performance) since the network upload bandwidth that is available to most of the client computing devices will generally be significantly smaller than the network download bandwidth that is available thereto. Furthermore, including the session state data in each client request message that the application client transmits to the application and in each application response message that the application transmits to the application client may increase the request-response latency for the client (and thus negatively impact the client's performance).

It is noted that the cost parameters associated with a given session state data replication option quantify the performance and/or resource utilization overheads associated with implementing the replication option compared to the performance and resource utilization when the replication option is not implemented (e.g., when the session state data is not replicated). For instance, it may be that the application already transmits all the session state data to the application client because the client can perform local processing on the session state data to serve some of the user's requests without having to contact the application. In this case the increase in request-response latency for the client would only be due to the client transmitting the session state data to the application. Similar considerations are used when numerical values are assigned to the various cost parameters described in this section.

TC1 is a cost parameter denoting the latency cost to the client computing device associated with it receiving (e.g., downloading) the session state data from the application, and transmitting (e.g., uploading) the session state data to the application, in replication option 1. In other words, TC1 denotes an increase in application client delay associated with this session state data reception and transmission. BC1 is another cost parameter denoting the network bandwidth cost to the client computing device associated with it receiving the session state data from the application, and transmitting the session state data to the application, in replication option 1. In other words, BC1 denotes the amount the application client has to pay for this session state data reception and transmission. BC1 may be zero when the client computing device is connected to the network via a wired connection having unlimited data. Alternatively, BC1 may be very high when the client computing device is connected to the network via a conventional cellular data connection operating in roaming mode. BATC1 is yet another cost parameter denoting the battery energy drain cost to the client computing device associated with the application client receiving the session state data from the application, and transmitting the session state data to the application, in replication option 1. In other words, BATC1 denotes how much battery energy in the client computing device is used for this session state data reception and transmission. While BATC1 may not be very relevant when the client computing device is operating from an AC (alternating current) power source, BATC1 is quite relevant when the client computing device is operating from battery power (e.g., when the client computing device is either a smartphone, or a tablet computer, or the like).

The second of the session state data replication options exemplified in FIG. 2 involves synchronously storing the most recent session state data for the interactive session in one or more of the backup data centers. This particular option is hereafter simply referred to as replication option 2. In replication option 2 the current data center uploads (e.g., transmits) the most recent session state data over the network to one or more of the backup data centers whenever the session state changes, thus ensuring that the backup data centers are storing the most recent session state data. The backup state store module will store this most recent session state data in the one or more backup data centers as described heretofore, and will then transmit a confirmation message to the current data center indicating that the most recent session state data has been successfully stored in the backup data centers. By way of example but not limitation, whenever the application receives a client request message from the application client, the current data center will upload the most recent session state data over the network to one or more of the backup data centers. The application will then wait to respond to the client request message until the current data center receives the confirmation message from at least one of the backup data centers. In one embodiment of replication option 2, the current data center will upload the entire set of most recent session state data to one or more of the backup data centers whenever the session state changes. In another embodiment of replication option 2, the current data center will upload the entire set of most recent session state data to one or more of the backup data centers the first time the session state changes, and the current data center will upload just the delta in the session state data to the backup data centers thereafter (e.g., the current data center will upload just the changes in the session state data since it was last uploaded to the backup data centers).

Replication option 2 has the following performance and resource cost trade-offs. Since replication option 2 does not burden the client computing device, it avoids any network bandwidth cost thereon. However, replication option 2 does increase the time that the application client has to wait to receive application response messages from the application, which negatively impacts the client's performance. TC2 is a cost parameter denoting the latency cost to the client computing device associated with the application client having to wait to receive application response messages from the application in replication option 2. In other words, TC2 denotes an increase in application client delay associated with this having to wait. Replication option 2 also increases the cost to the current data center for hosting the application since the current data center has to pay for the network bandwidth it uses to upload the most recent session state data to one or more of the backup data centers. BD2 is another cost parameter denoting the network bandwidth cost to the current data center associated with it uploading the session state data to one or more of the backup data centers in replication option 2. In other words, BD2 denotes the amount the current data center has to pay for this session state data upload. Replication option 2 also presents the current data center with the cost of storing the session state data in one or more of the backup data centers. SD2 is yet another cost parameter denoting the data storage cost to the current data center associated with it storing the session state data in one or more of the backup data centers in replication option 2.

The third of the session state data replication options exemplified in FIG. 2 involves storing an encoded version of the most recent session state data for the interactive session on the client computing device, where the encoding reduces the data size. This particular option is hereafter simply referred to as replication option 3. Generally speaking, in replication option 3 an encoded version of the most recent session state data for the interactive session is added to each application response message that the application transmits over the network to the application client, and an encoded version of the most recent session state data for the interactive session is added to each of the client request messages that the application client transmits over the network to the application. As such each of the application response messages that the application client receives from the application will include an encoded version of the most recent session state data. Upon the application client receiving a given application response message, the application client will extract the encoded version of the most recent session state data from the application response message, and the client state store module will store this extracted data on the client computing device as described heretofore. Similarly, each client request message that the application receives from the application client will include an encoded version of the most recent session state data. Accordingly, in the event that the current data center goes offline and a given client request message from the application client is diverted to the backup data center, the copy of the application that receives the client request message will have an encoded version of the most recent session state data since it is included in the client request message. It will be appreciated that an encoded version of the most recent session state data can be added to the client request messages and the application response messages in various ways including, but not limited to, the aforementioned various ways that were described in relation to replication option 1.

As will now be described in more detail, the encoded version of the session state data that is transmitted over the network and stored on the client computing device in replication option 3 is smaller in size than the non-encoded version of the session state data that is transmitted over the network and stored on the client computing device in replication option 1. In fact, for certain applications the encoded version of the session state data may be substantially smaller than the non-encoded version thereof. More particularly and by way of example but not limitation, in one embodiment of the disaster recovery technique described herein the encoded version of the most recent session state data includes just the data that the user most recently entered into the client computing device (hereafter simply referred to as most recent user-entered data). In the event that the current data center goes offline and a given client request message from the application client is diverted to a backup data center, the copy of the application that receives the client request message can process the most recent user-entered data and re-create the remainder of the most recent session state data. In another embodiment of the disaster recovery technique the encoded version of the session state data is a compressed version of all of the session state data that is transmitted and stored in replication option 1. . This compression and the subsequent decompression of the session state data can be performed using any data compression method. By way of example but not limitation, in an exemplary embodiment of the disaster recovery technique a conventional delta compression method is used for this compression and decompression; this particular method is advantageous since, as described heretofore, the session state can change incrementally as user interactions with the application progress.

TC3 is a cost parameter denoting the latency cost to the client computing device associated with it receiving the encoded session state data from the application, and transmitting the encoded session state data to the application, in replication option 3. In other words, TC3 denotes an increase in application client delay associated with this encoded session state data reception and transmission. BC3 is another cost parameter denoting the network bandwidth cost to the client computing device associated with it receiving the encoded session state data from the application, and transmitting the encoded session state data to the application, in replication option 3. In other words, BC3 denotes the amount the application client has to pay for this encoded session state data reception and transmission. BC3 may be zero when the client computing device is connected to the network via a wired connection having unlimited data. Alternatively, BC3 may be very high when the client computing device is connected to the network via a cellular data connection operating in roaming mode. BATC3 is yet another cost parameter denoting the battery energy drain cost to the client computing device associated with the application client receiving the encoded session state data from the application, and transmitting the encoded session state data to the application, in replication option 3. In other words, BATC3 denotes how much battery energy in the client computing device is used for this encoded session state data reception and transmission. While BATC3 may not be very relevant when the client computing device is operating from an AC power source, BATC3 is quite relevant when the client computing device is operating from battery power.

Since replication option 3reduces the size of the session state data that is transmitted over the network and stored on the client computing device, TC3 will be less than TC1, BC3 will be less than BC1, and BATC3 will be less than BATC1. In fact, for certain applications TC3, BC3 and BATC3 may be substantially less than TC1, BC1 and BATC1 respectively. CD3 is yet another cost parameter denoting the processing cost to the current data center associated with the application decoding the encoded session state data in replication option 3. It will be appreciated that the application in the current data center has to decode the encoded session state data in each client request message it receives from the client (e.g., either process the user-entered data and re-create the remainder of the most recent session state data, or decompress the compressed session state data to produce the most recent session state data) in order to be able to respond to the client request message. This decoding operation will increase the processor overhead in the current data center, and will also slightly increase the request-response latency for the client.

The fourth of the session state data replication options exemplified in FIG. 2, hereafter simply referred to as replication option 4, also involves storing the most recent session state data for the interactive session on the client computing device. Replication option 4 is similar to replication option 1 in that the most recent session state data for the interactive session is added to each application response message that the application transmits over the network to the application client. Upon the application client receiving a given application response message, the application client will extract the most recent session state data from the application response message, and the client state store module will store this extracted data on the client computing device as described heretofore. It is noted that the most recent session state data can be added to the application response messages in various ways including, but not limited to, the aforementioned various ways that were described in relation to replication option 1.

Replication option 4 differs from replication option 1 in the following ways. In replication option 4, rather than the most recent session state data for the interactive session being added to each of the client request messages that the application client transmits over the network to the application, failure detection software on the client computing device (e.g., the aforementioned failure detector module) is responsible for detecting when the current data center that is serving the interactive session has gone offline and thus has become unable to continue serving the session. Whenever this failure detection software detects that the current data center has gone offline and become unable to continue serve the interactive session, the application client will upload the most recent session state data for the interactive session to a backup data center that has been selected to take over serving the interactive session. The most recent session state data for the interactive session will then be added to each application response message that the copy of the application transmits over the network to the application client. Upon the application client receiving a given application response message from the copy of the application, the application client will extract the most recent session state data from the application response message, and the client state store module will store this extracted data on the client computing device as described heretofore.

TC4 is a cost parameter denoting the latency cost to the client computing device associated with it receiving the session state data from the application, and transmitting the session state data to a backup data center whenever the current data center becomes unable to continue serving the interactive session, in replication option 4. In other words, TC4 denotes an increase in application client delay associated with this session state data reception and transmission. BC4 is another cost parameter denoting the network bandwidth cost to the client computing device associated with it receiving the session state data from the application, and transmitting the session state data to a backup data center whenever the current data center becomes unable to continue serving the interactive session, in replication option 4. In other words, BC4 denotes the amount the application client has to pay for this session state data reception and transmission. BC4 may be zero when the client computing device is connected to the network via a wired connection having unlimited data. Alternatively, BC4 may be very high when the client computing device is connected to the network via a cellular data connection operating in roaming mode. BATC4 is yet another cost parameter denoting the battery energy drain cost to the client computing device associated with the application client receiving the session state data from the application, and the client transmitting the session state data to a backup data center whenever the current data center becomes unable to continue serving the interactive session, in replication option 4. In other words, BATC4 denotes how much battery energy in the client computing device is used for this session state data reception and transmission. While BATC4 may not be very relevant when the client computing device is operating from an AC power source, BATC4 is quite relevant when the client computing device is operating from battery power. Since replication option 4 does not involve the application client adding the session state data to each client request message the application client transmits over the network to the application (as is done in replication option 1.), TC4 will be less than TC1, BC4 will be less than BC1, and BATC4 will be less than BATC1.

The fifth of the session state data replication options exemplified in FIG. 2 involves asynchronously storing the most recent session state data for the interactive session in one or more of the backup data centers. This particular option is hereafter simply referred to as replication option 5. In replication option 5 the current data center uploads the most recent session state data (either the entire set thereof, or just the delta therein, as described in relation to replication option 2) over the network to one or more of the backup data centers whenever the session state changes, thus ensuring that the backup data centers are storing the most recent session state data. The backup state store module will store this most recent session state data in the one or more backup data centers as described heretofore, and will then transmit a confirmation message to the current data center indicating that the most recent session state data has been successfully stored in the backup data centers. By way of example but not limitation, whenever the application receives a client request message from the application client, the current data center will upload the most recent session state data over the network to one or more of the backup data centers.

However, rather than the application waiting to respond to the client request message until the current data center receives the confirmation message from at least one of the backup data centers (as is done in replication option 2), in replication option 5 the application will respond to the client request message before the current data center receives this confirmation message from at least one of the backup data centers, but the application client will wait to expose the application response to the user of the client computing device until the confirmation message is received from at least one of the backup data centers. Accordingly, in replication option 5, during the time that the most recent session state data is being uploaded to the backup data centers the client computing device is already downloading the application response, thus hiding some of the network round trip time between the current and backup data centers. It will be appreciated that doing this introduces a risk that if the current data center were to fail after the most recent session state data is transmitted to the backup data centers, and the backup data centers fail to receive the most recent session state data due to a network data transmission error, then the most recent session state data will not be available to the copies of the application when one of the backup data centers is selected to take over serving the interactive session.

Replication option 5 can address this risk (e.g., prevent a failure of the current data center from causing the most recent session state data to be lost) in various ways. By way of example but not limitation, in one embodiment of the disaster recovery technique described herein, the application can wait a prescribed period of time after the most recent session state data for the interactive session is uploaded to one or more backup data centers before the application responds to the client request message, where this period of time is made large enough to ensure that the most recent session state data has left the current data center (e.g., has left the current data center's internal network (not shown) and has been transmitted onto the external network). In another embodiment of the disaster recovery technique the current data center can add forward error correction (FEC) codes to the most recent session state data before it is uploaded to the backup data centers. As is appreciated in the art of data communication, if just some of the uploaded data is successfully received by a given backup data center and the rest of the uploaded data is lost by the either the current data center's internal network or the external network, the FEC codes allow the backup data center to reconstruct the data that was lost.

Replication option 5 has the following performance and resource cost trade-offs. Since replication option 5 does not burden the client computing device, it avoids any network bandwidth cost thereon. However, replication option 5 does very slightly increase the time that the application client has to wait to receive application response messages from the application, which has a very small negative impact on the client's performance. TC5 is a cost parameter denoting the latency cost to the client computing device associated with the application client having to wait to receive application response messages from the application in replication option 5. In other words, TC5 denotes an increase in application client delay associated with the extra amount of time that the application client has to wait to receive application response messages from the application in replication option 5. BATC5 is another cost parameter denoting the battery energy drain cost to the client computing device associated with the application client having to wait this extra amount of time. Given the foregoing, it will be appreciated that TC5 will generally be less than TC2.

Replication option 5 increases the cost to the current data center for hosting the application since the current data center has to pay for the network bandwidth it uses to upload the most recent session state data to one or more of the backup data centers. BD5 is yet another cost parameter denoting the network bandwidth cost to the current data center associated with it uploading the session state data and FEC codes to one or more of the backup data centers in replication option 5. In other words, BD5 denotes the amount the current data center has to pay for this session state data and FEC codes upload. Due to the addition of the FEC codes to the data that is transmitted, BD5 will be greater than BD2. Replication option 5 also presents the current data center with the cost of storing the session state data in one or more of the backup data centers. SD5 is yet another cost parameter denoting the data storage cost to the current data center associated with it storing the session state data in one or more of the backup data centers in replication option 5. It will be appreciated that SD5 will be the same as SD2.

The sixth of the session state data replication options exemplified in FIG. 2 is a variant of replication option 3 that involves storing an encrypted version of the most recent session state data for the interactive session on the client computing device. This particular option is hereafter simply referred to as replication option 6. Replication option 6 is applicable to a situation where the session state data that is computed by the application is to be stored on the client computing device but is not to be disclosed to the user of the client computing device. One example of such a situation is an online card game application where the session state data that is computed by the application includes the hand of cards that is generated for all of the users that are currently playing the game. Encrypting this session state data prevents the hand of cards for users other than the client computing device's user, and the hand of cards for the computerized player, from being disclosed to the client computing device's user. The session state data can be encrypted using any conventional data encryption method.

TC6 is a cost parameter denoting the latency cost to the client computing device associated with it receiving the encrypted session state data from the application in replication option 6. In other words, TC6 denotes an increase in application client delay associated with this encrypted session state data reception. BC6 is another cost parameter denoting the network bandwidth cost to the client computing device associated with it receiving the encrypted session state data from the application in replication option 6. In other words, BC6 denotes the amount the application client has to pay for this encrypted session state data reception. BC6 may be zero when the client computing device is connected to the network via a wired connection having unlimited data. Alternatively, BC6 may be very high when the client computing device is connected to the network via a cellular data connection operating in roaming mode. BATC6 is yet another cost parameter denoting the battery energy drain cost to the client computing device associated with the application client receiving the encrypted session state data from the application in replication option 6. In other words, BATC6 denotes how much battery energy in the client computing device is used for this encrypted session state data reception. While BATC6 may not be very relevant when the client computing device is operating from an AC power source, BATC6 is quite relevant when the client computing device is operating from battery power. CD6 is yet another cost parameter denoting the processing cost to the current data center associated with the application encrypting the encoded session state data in replication option 6. This encryption operation will increase the processor overhead in the current data center, and will also slightly increase the request-response latency for the client.

The seventh of the session state data replication options exemplified in FIG. 2, hereafter simply referred to as replication option 7, is a hybrid option that can include any combination of replication options 1-6. By way of example but not limitation, in the aforementioned situation where a plurality of application clients running on different client computing devices is jointly participating in an interactive session at the same time, a session state data replication option can be independently selected for each of the client computing devices. In other words and referring again to FIG. 1, the decision engine module may decide to store the session state data on all of the client computing devices. The decision engine module may also decide to store the session state data on just some of the client computing devices and in one or more of the backup data centers. The decision engine module may also decide to store the session state data on just one or more of the backup data centers.

Additionally, replication option 2 can be used to store the session state data for the interactive session in a backup data center that is near the current data center, and replication option 5 can be used to store the session state data in another backup data center that is not near (e.g., is far away from) the current data center. This combined utilization of replication options 2 and 5 is advantageous since the backup data center that is near the current data center is not likely to fail at the same time as the backup data center that is not near the current data center (especially in the situation where the failure is triggered by an earthquake, or fire, or lightning strike, or other type of natural disaster). Replication option 3 can also be combined with either replication option 2 or replication option 5 so that an encoded version of the session state data for the interactive session is either synchronously or asynchronously stored in each of the backup data centers. As indicated in FIG. 2, various combinations of the different performance and resource cost parameters that are associated with replication options 1-6 become relevant in replication option 7.

The different performance and resource cost parameters that are associated with replication options 1-7 might not be static and their values might not be known upfront when a given cloud application is being developed or deployed. By way of example but not limitation, for an interactive session involving a user who is using a client computing device that is operating from battery power and is connected to the network via a wireless connection such as a conventional cellular data connection, or WiFi connection, or the like (e.g., when the client computing device is either a smartphone, or a tablet computer, or the like), the client's network bandwidth cost (e.g., BC1) and battery energy drain cost (e.g., BATC1) may be very high. On the other hand, for an interactive session involving a user who is using a client computing device that is operating from AC power and is connected to the network via a wired connection, the client's network bandwidth cost and battery energy drain cost may be negligible. Furthermore, the current data center's network bandwidth cost (e.g., BD2) and data storage cost (e.g., SD2) may change over time depending on various factors such as changes in the load on the current and backup data centers. Yet furthermore, it will be appreciated that the time the application client has to wait to receive application response messages from the application (e.g., TC2) depends on how far the backup data centers are from the current data center. When a given cloud application is first deployed, this client wait time may be high since the application may initially be hosted on just two data centers that are located far apart from one another. As the usage of the application grows, the application may be deployed in additional data centers in different locations, or the application may start to rent data center capacity offered by cloud service providers in different locations, either of which may decrease the distance between the current data center and one or more of the backup data centers, thus decreasing the client wait time (e.g., decreasing TC2).

It will thus be appreciated that the values of the different performance and resource cost parameters that are associated with replication options 1-7 can be different for different interactive sessions with a given cloud application, and can change over time. The disaster recovery technique embodiments described herein can select an appropriate session state data replication option when the application is first deployed since some of the performance and resource cost parameters become known at this time (e.g., the initial number of data centers hosting the application becomes known, the physical locations and thus the distances between the various pairs of the data centers becomes known, and the network bandwidth and data storage costs for each of the data centers become known). The disaster recovery technique embodiments can also select an appropriate session state data replication option whenever there are configuration changes in the computing and networking infrastructure that supports the application (e.g., whenever the number and/or physical locations of data centers hosting the application changes, or whenever the network bandwidth and data storage costs for one or more of the data centers changes).

The disaster recovery technique embodiments described herein can also select an appropriate session state data replication option whenever a new interactive session is established between a given cloud application that is running on a given data center and an application client that is running on a given client computing device that is being used by a given user (in this case, all of the performance and resource cost parameters that are associated with replication options 1-7 can be considered). After the interactive session is established and an appropriate session state data replication option has been selected, the disaster recovery technique embodiments can also monitor all of the performance and resource cost parameters and again select an appropriate session state data replication option whenever there are changes in these parameters, where this newly selected option can be either the same as or different than the previously selected option.

1.4 Selecting an Option for Replicating Session State Data

This section provides a more detailed description of the aforementioned various methods that the decision engine module can use to select an appropriate option for replicating the session state data for the interactive cloud application that is being hosted on the current data center. This selection is made from a set of different session state data replication options that includes, but is not limited to, the aforementioned replication options 1-7. As described heretofore, each of these replication options has different performance and resource cost trade-offs. As also described heretofore and will now be described in more detail, this selection can be based on various network performance conditions and resource availability conditions that can be measured by the client resource probe module, current server resource probe module, and backup server resource probe module. This selection can also be based on various performance constraints and resource cost constraints, and a prioritization thereof, that can be specified by the application.

Figure 3:
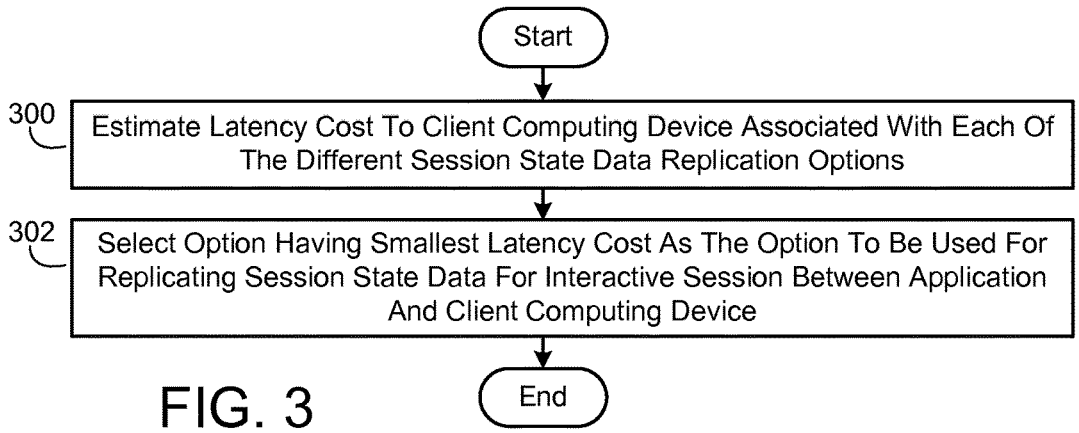
FIG. 3 is a flow diagram illustrating one embodiment, in simplified form, of a process for selecting an appropriate option for replicating the session state data for a cloud application that is being hosted on a data center.

FIG. 3 illustrates one embodiment, in simplified form, of a process for selecting an appropriate option for replicating the session state data for the cloud application that is being hosted on the current data center. As exemplified in FIG. 3, the process starts in block 300 with estimating the latency cost to a client computing device associated with each of the session state data replication options in the set of different session state data replication options. In other words, and by way of example but not limitation, TC1, TC2, TC3, TC4, TC5 and TC6 can be estimated using the various measurement techniques described heretofore. The session state data replication option having the smallest estimated latency cost to the client computing device is then selected as the option to be used for replicating the session state data for an interactive session between the application and the client (block 302). It will thus be appreciated that the process embodiment exemplified in FIG. 3 minimizes the latency cost to the client computing device associated with replicating the session state data, and thus minimizes the delay overhead that a user will experience due to the session state data replication.

Figure 4:
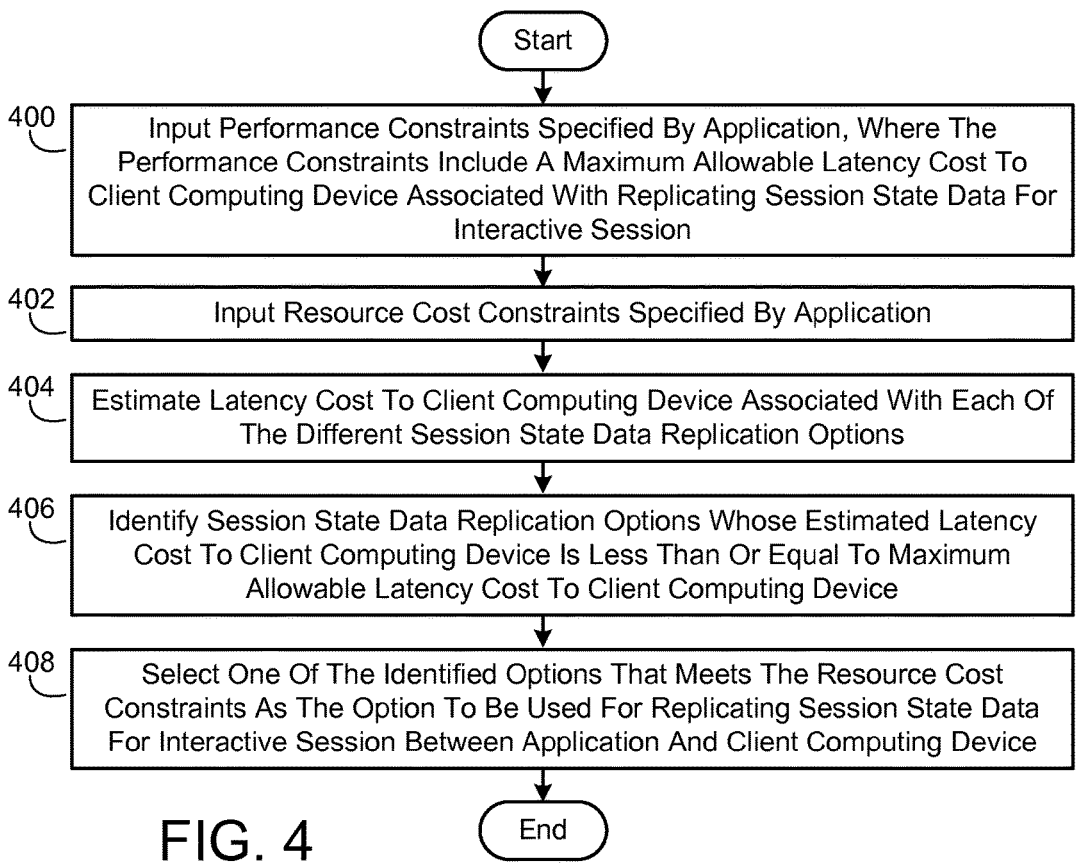
FIG. 4 is a flow diagram illustrating another embodiment, in simplified form, of a process for selecting an appropriate option for replicating the session state data for the cloud application.

FIG. 4 illustrates another embodiment, in simplified form, of a process for selecting an appropriate option for replicating the session state data for the cloud application that is being hosted on the current data center. As exemplified in FIG. 4, the process starts in block 400 with inputting one or more performance constraints that are specified by the application. These performance constraints include a maximum allowable latency cost to a client computing device associated with replicating the session state data for the interactive session (e.g., a constraint on TC1, TC2, TC3, TC4, TC5 and TC6). The performance constraints can optionally also include a minimum allowable availability for the application. One or more resource cost constraints that are specified by the application are then input (block 402). These resource cost constraints can include one or more of client resource cost constraints or data center resource cost constraints. Exemplary client resource cost constraints include, but are not limited to, one or more of a constraint on the network bandwidth cost to the client computing device associated with replicating the session state data for the interactive session (e.g., a constraint on BC1, BC3, BC4 and BC6), or a constraint on the battery energy drain cost to the client computing device associated with replicating this session state data (e.g., a constraint on BATC1, BATC3, BATC4, BATC5 and BATC6), or a constraint on the processing cost to (e.g., a processor utilization budget for) the client computing device associated with replicating this session state data, or a constraint on the memory cost to (e.g., a memory utilization budget for) the client computing device associated with replicating this session state data. Exemplary data center resource cost constraints include, but are not limited to, one or more of a constraint on the network bandwidth cost to the current data center associated with replicating the session state data for the interactive session (e.g., a constraint on BD2 and BD5), or a constraint on the data storage cost to the current data center associated with replicating this session state data (e.g., a constraint on SD2 and SD5), or a constraint on the processing cost to the current data center associated with replicating this session state data.

Referring again to FIG. 4, after the performance and resource cost constraints have been input (blocks 400 and 402), the latency cost to the client computing device associated with each of the session state data replication options in the set of different session state data replication options is estimated (block 404) as described heretofore. The session state data replication options whose estimated latency cost to the client computing device is less than or equal to the just-described maximum allowable latency cost to the client computing device are then identified (block 406). One of these identified options that meets the resource cost constraints is then selected as the option to be used for replicating the session state data for the interactive session (block 408). It will thus be appreciated that the process embodiment exemplified in FIG. 4 can jointly minimize both the latency cost to the client computing device associated with replicating the session state data, and one or more prescribed resource costs that are associated with replicating the session state data.

Figure 5:
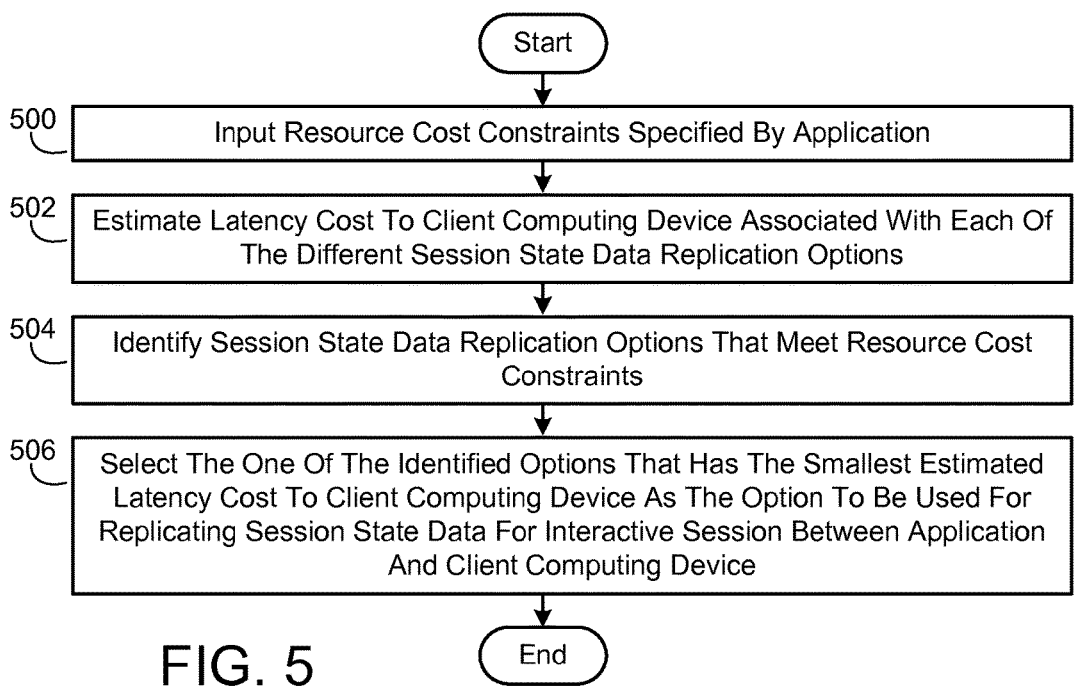
FIG. 5 is a flow diagram illustrating yet another embodiment, in simplified form, of a process for selecting an appropriate option for replicating the session state data for the cloud application.

FIG. 5 illustrates yet another embodiment, in simplified form, of a process for selecting an appropriate option for replicating the session state data for the cloud application that is being hosted on the current data center. As exemplified in FIG. 5, the process starts in block 500 with inputting one or more resource cost constraints that are specified by the application. The latency cost to a client computing device associated with each of the session state data replication options in the set of different session state data replication options is then estimated (block 502). The session state data replication options that meet the resource cost constraints are then identified (block 504). The one of these identified options that has the smallest estimated latency cost to the client computing device is then selected as the option to be used for replicating the session state data for the interactive session (block 506). It will thus be appreciated that the process embodiment exemplified in FIG. 5 can also jointly minimize both the latency cost to the client computing device associated with replicating the session state data, and one or more prescribed resource costs that are associated with replicating the session state data.

It is noted that the resource cost constraints can be specified by the application in various ways. By way of example but not limitation, the resource cost constraints can be specified for individual interactive sessions with the application. The resource cost constraints can also be specified as a total resource cost budget that is to be allocated across a plurality of interactive sessions with the application. In this case, the decision engine module can allocate the total resource cost budget in various ways including, but not limited to, the following. The decision engine module can allocate the total resource cost budget on the fly to individual interactive sessions having a current network latency that is higher than a prescribed threshold (e.g., additional resources can be used to reduce the network latency and thus reduce the user response times). The decision engine module can also allocate the total resource cost budget over a prescribed period of time. More particularly and by way of example but not limitation, specific amounts of the budget can be allocated to specific days of the week. The budget can be allocated in proportion to the application load (e.g., the user demand for the application) that is expected over the period of time. In other words, different portions of the budget can be allocated to different segments of the period of time based on the application load that is expected during each of the segments.

An alternate embodiment of the disaster recovery technique described herein is also possible where the one or more performance constraints that are specified by the application, and the one or more resource cost constraints that are specified by the application, can be combined into a unified constraint by applying a weight to each of the performance constraints and each of the resource cost constraints. It will be appreciated that the weights that are applied to the different performance and resource cost constraints serve to prioritize these constraints. By way of example but not limitation, these weights can be used to specify the relative importance to the application of the latency cost to the client computing device as compared to the network bandwidth cost to the client computing device. The weights can be determined in various ways. By way of example but not limitation, in an exemplary implementation of this alternate embodiment the weights are pre-determined by the application.

1.5 Process Framework

Figure 6:
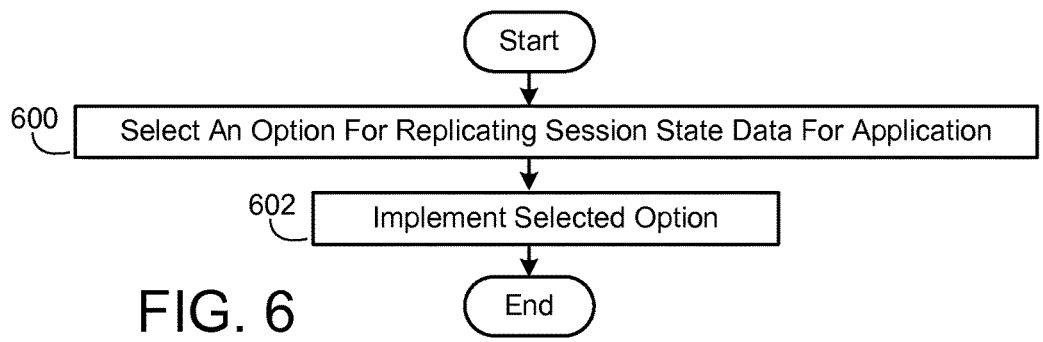
FIG. 6 is a flow diagram illustrating an exemplary embodiment, in simplified form, of the server side of a process for ensuring the availability of the cloud application.

FIG. 6 illustrates an exemplary embodiment, in simplified form, of the server side of a process for ensuring the availability of a cloud application that is being hosted on a current data center. As exemplified in FIG. 6, the process starts in block 600 with selecting an option for replicating session state data for the application. As described heretofore, this selection is made from a set of different session state data replication options each of which has different performance and resource cost trade-offs, and the selected option determines how the session state data for the application is to be replicated. The selected option is then implemented (block 602), where the implementation results in the session state data for the application being replicated outside of the current data center, thus ensuring that this data remains available in the event that that current data center goes offline.

Figure 7:
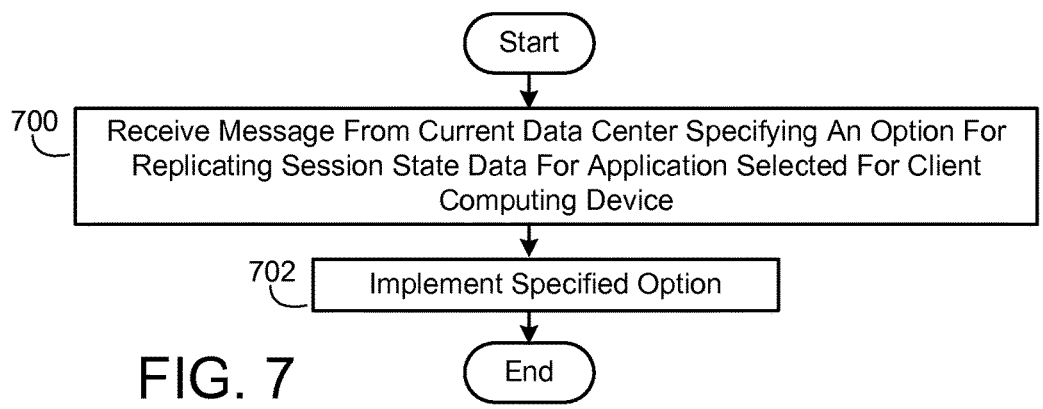
FIG. 7 is a flow diagram illustrating an exemplary embodiment, in simplified form, of the client side of a process for providing disaster recovery for the cloud application.

FIG. 7 illustrates an exemplary embodiment, in simplified form, of the client side of a process for providing disaster recovery for the cloud application that is being hosted on the current data center. As exemplified in FIG. 7, the process starts in block 700 with receiving a message from the current data center specifying an option for replicating session state data for the application that has been selected for a given client computing device. The specified option is then implemented (block 702), where the implementation results in the session state data for the application being replicated outside of the current data center.

2.0 Provisioning and Using Spare Data Center Capacity

Referring again to FIG. 1, the disaster recovery technique embodiments described heretofore assume that a plurality of data centers (e.g., 104/106/118) exist in the cloud 138, and also assume that this plurality of data centers includes one or more backup data centers 106/118 which have sufficient spare (e.g., idle) capacity (e.g., sufficient spare/idle processing capacity and sufficient spare/idle data storage capacity) to take over the current application load of the current data center 104 if it fails. In other words, the disaster recovery technique embodiments described heretofore assume that the backup data centers have sufficient spare capacity to take over serving the interactive sessions 112 that are currently taking place with the cloud applications 114 that are currently being hosted by the current data center in the event that it fails.

This section describes an exemplary embodiment of the disaster recovery technique described herein that adds spare capacity to each of the data centers in the cloud, where this spare capacity is sufficient to allow a failure of any one of the data centers to be accommodated by the remaining data centers. In other words, if any one of the data centers in the cloud fails, the spare capacity that is added to each of the remaining data centers by the disaster recovery technique embodiment described in this section allows the current application load of the failed data center to be distributed across the remaining data centers (e.g., the remaining data centers can collectively take over serving the interactive sessions that were being served by the failed data center).

Figure 8:
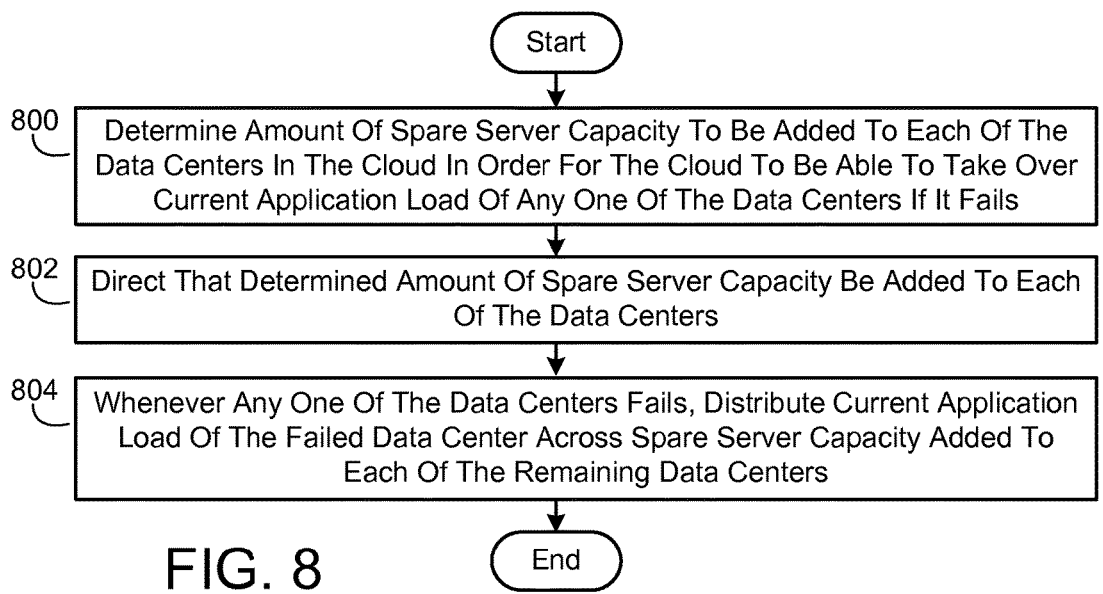
FIG. 8 is a flow diagram illustrating an exemplary embodiment, in simplified form, of a process for provisioning and using spare data center capacity in the cloud.

FIG. 8 illustrates an exemplary embodiment, in simplified form, of a process for provisioning and using spare data center capacity in the cloud. As exemplified in FIG. 8, the process starts in block 800 with determining an amount of spare server capacity (e.g., the number of additional servers) that has to be added to each of the data centers in the cloud in order for the cloud to be able to take over the current application load of any one of the data centers if it fails. This determination is made by taking into account different factors which include, but are not limited to, one or more of the following: the total number of data centers in the cloud, the current server capacity of (e.g., the current number of servers in) each of the data centers, and the geographic location of each of the data centers. After the amount of spare server capacity to be added to each of the data centers has been determined (block 800), it is then directed that this determined amount of spare server capacity be added to each of the data centers (block 802). Then, whenever any one of the data centers fails, the current application load of the failed data center will be distributed across the spare server capacity that was added to each of the remaining data centers (804).

It is noted that the process embodiment exemplified in FIG. 8 is applicable to situations where either the current server capacity of each of the data centers in the cloud in the cloud is either the same, or the current server capacity of one or more of the data centers is different than the current server capacity of others of the data centers. The process embodiment exemplified in FIG. 8 is also applicable to situations where either all of the data centers are located in the same geographic region, or the data centers are located in two or more different geographic regions, where these different geographic regions may be in either the same time zone or different time zones. It is also noted that depending on the particular factors that are taken into account when the just-described determination of spare server capacity is made, either the same amount of spare server capacity can be added to each of the data centers, or different amounts of spare server capacity can be added to different ones of the data centers.

Given the foregoing, it will be appreciated that the process embodiment exemplified in FIG. 8 is advantageous in that it can minimize the amount of spare capacity that has to be added to each of the data centers in the cloud in order for the cloud to be able to take over the current application load of any one of the data centers if it fails. Accordingly, the process embodiment exemplified in FIG. 8 can minimize the expense associated with provisioning spare data center capacity.

3.0 Additional Embodiments

While the disaster recovery technique has been described by specific reference to embodiments thereof, it is understood that variations and modifications thereof can be made without departing from the true spirit and scope of the disaster recovery technique. By way of example but not limitation, an embodiment of the disaster recovery technique described herein is possible where the session state data for a given interactive session between a given cloud application and a given application client includes one or more data items that cannot be stored on just the client computing device that is running the application client. By way of example but not limitation, when the interactive session is a Hyper Text Transfer Protocol Secure (HTTPS) session (such as when a user makes ecommerce transactions on a secure banking website), the cryptographic keys associated with the HTTPS session have to be stored on both the application server and the client computing device, and the application and application client already take care of this. In such a situation, just session state data replication options that store the most recent session state data on one or more backup data centers (e.g., either the aforementioned replication option 2 or replication option 5) will be used since the backup data centers have to have the private (e.g., secret) key to even decrypt any client request messages the backup data centers may receive from the application client in the event that the current data center goes offline.

Another embodiment of the disaster recovery technique described herein is also possible where the most recent session state data that is stored on a given client computing device during a given interactive session is encrypted by the client state store module. More particularly, after the application client has extracted the most recent session state data for the interactive session from a given application response message, the client state store module will encrypt this extracted data using any conventional data encryption method, and will then store this encrypted data and an associated encryption key on the client computing device. Additionally, in replication option 4, whenever the failure detector module detects that the current data center has gone offline, the session resume request message that the application client transmits to the backup data center that has been selected to take over serving the interactive session will include both the encrypted most recent session state data for the interactive session and the associated encryption key that are stored on the client computing device. This allows the backup data center to decrypt the encrypted most recent session state data before it resumes the interactive session with the client computing device. This particular embodiment is applicable in situations where the session state data includes proprietary information that may not be appropriate to expose to a user. Examples of such proprietary information include customer profiling data in an customer database, a selection of advertisements to be shown or discount codes to be offered during the session, certain types of information generated by an ecommerce application, and the like. Additionally, in an online card game application the session state data may include the hand of cards that is generated for all of the users that are currently playing the game. Storing such proprietary information in encrypted form on the client computing device is advantageous since the information is kept secure.

It is also noted that any or all of the aforementioned embodiments can be used in any combination desired to form additional hybrid embodiments. Although the disaster recovery technique embodiments have been described in language specific to structural features and/or methodological acts, it is to be understood that the subject matter defined in the appended claims is not necessarily limited to the specific features or acts described heretofore. Rather, the specific features and acts described heretofore are disclosed as example forms of implementing the claims.

4.0 Exemplary Operating Environments

Figure 9:
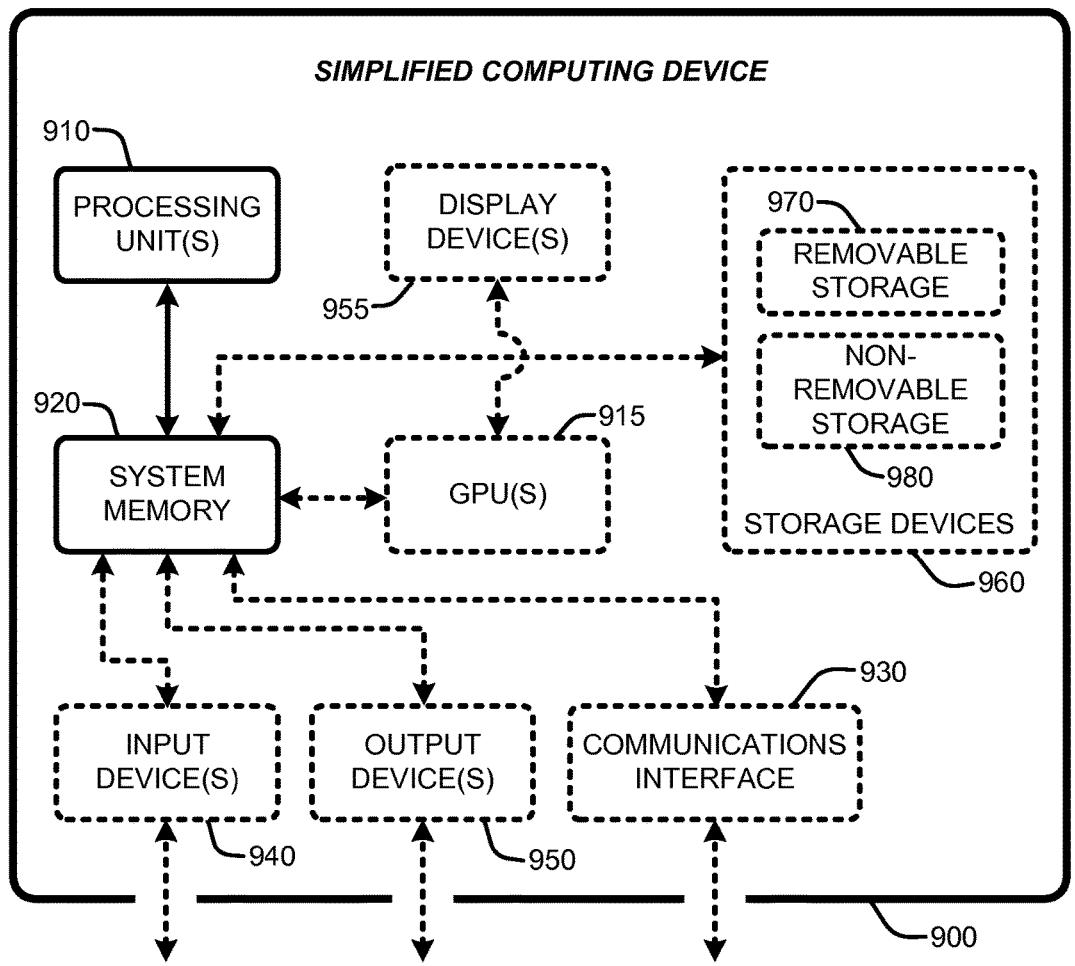
FIG. 9 is a diagram illustrating a simplified example of a general-purpose computer system on which various embodiments and elements of the geo-distributed disaster recovery technique, as described herein, may be implemented.

The disaster recovery technique embodiments described herein are operational within numerous types of general purpose or special purpose computing system environments or configurations. FIG. 9 illustrates a simplified example of a general-purpose computer system on which various embodiments and elements of the disaster recovery technique, as described herein, may be implemented. It is noted that any boxes that are represented by broken or dashed lines in the simplified computing device 900 shown in FIG. 9 represent alternate embodiments of the simplified computing device. As described below, any or all of these alternate embodiments may be used in combination with other alternate embodiments that are described throughout this document. The simplified computing device 900 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to implement the disaster recovery technique embodiments described herein, the device should have a sufficient computational capability and system memory to enable basic computational operations. In particular, the computational capability of the simplified computing device 900 shown in FIG. 9 is generally illustrated by one or more processing unit(s) 910, and may also include one or more graphics processing units (GPUs) 915, either or both in communication with system memory 920. Note that that the processing unit(s) 910 of the simplified computing device 900 may be specialized microprocessors (such as a digital signal processor (DSP), a very long instruction word (VLIW) processor, a field-programmable gate array (FPGA), or other micro-controller) or can be conventional central processing units (CPUs) having one or more processing cores.

In addition, the simplified computing device 900 shown in FIG. 9 may also include other components such as a communications interface 930. The simplified computing device 900 may also include one or more conventional computer input devices 940 (e.g., pointing devices, keyboards, audio (e.g., voice) input devices, video input devices, haptic input devices, gesture recognition devices, devices for receiving wired or wireless data transmissions, and the like). The simplified computing device 900 may also include other optional components such as one or more conventional computer output devices 950 (e.g., display device(s) 955, audio output devices, video output devices, devices for transmitting wired or wireless data transmissions, and the like). Note that typical communications interfaces 930, input devices 940, output devices 950, and storage devices 960 for general-purpose computers are well known to those skilled in the art, and will not be described in detail herein.

The simplified computing device 900 shown in FIG. 9 may also include a variety of computer-readable media. Computer-readable media can be any available media that can be accessed by the computer 900 via storage devices 960, and can include both volatile and nonvolatile media that is either removable 970 and/or non-removable 980, for storage of information such as computer-readable or computer-executable instructions, data structures, program modules, or other data. Computer-readable media includes computer storage media and communication media. Computer storage media refers to tangible computer-readable or machine-readable media or storage devices such as digital versatile disks (DVDs), compact discs (CDs), floppy disks, tape drives, hard drives, optical drives, solid state memory devices, random access memory (RAM), read-only memory (ROM), electrically erasable programmable read-only memory (EEPROM), flash memory or other memory technology, magnetic cassettes, magnetic tapes, magnetic disk storage, or other magnetic storage devices.

Retention of information such as computer-readable or computer-executable instructions, data structures, program modules, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. Note that the terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, and/or computer program products embodying some or all of the various disaster recovery technique embodiments described herein, or portions thereof, may be stored, received, transmitted, or read from any desired combination of computer-readable or machine-readable media or storage devices and communication media in the form of computer-executable instructions or other data structures.

Finally, the disaster recovery technique embodiments described herein may be further described in the general context of computer-executable instructions, such as program modules, being executed by a computing device. Generally, program modules include routines, programs, objects, components, data structures, and the like, that perform particular tasks or implement particular abstract data types. The disaster recovery technique embodiments may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

Wherefore, what is claimed is:

1. A computer-implemented process for ensuring the availability of an application being hosted on a current data center, comprising:
   using one or more server computers in the current data center to perform the following process actions:
   detecting a change in run-time conditions of a client computer;
   selecting an option for replicating session state data associated with an interactive session established between a user of the client computer and the application executing on the one or more server computers, said selection being based on performance constraints and resource cost constraints, and a prioritization thereof, that are specified by the application, said selection being made from a set of different session state data replication options, each of said options having different performance and resource cost trade-offs, said selected option determining how, including where, said data is to be replicated; and implementing said selected option, the implementation resulting in said data being replicated outside of the current data center, thus ensuring that said data remains available in the event that the current data center goes offline, and wherein said selected option comprises storing the most recent session state data for the interactive session on the client computer, and the action of implementing said selected option comprises, transmitting a message to the client computer specifying said selected option, receiving client request messages from the client computer, each of the client request messages comprising the most recent session state data for the interactive session, and adding the most recent session state data for the interactive session to each application response message that the application transmits to the client computer.

2. The process of claim 1, wherein the action of adding the most recent session state data for the interactive session to each application response message that the application transmits to the client computer comprises an action of either: adding the entire set of most recent session state data to each application response message that the application transmits to the client computer; or adding the entire set of most recent session state data to a first application response message that the application transmits to the client computer, and adding the entire set of most recent session state data to every Nth application response message thereafter that the application transmits to the client computer, N being a prescribed number greater than one; or adding the entire set of most recent session state data to the first application response message that the application transmits to the client computer, and adding just the delta in the session state data to each application response message thereafter that the application transmits to the client computer; or adding the entire set of most recent session state data to the first application response message that the application transmits to the client computer, and adding just the delta in the session state data to every Nth application response message thereafter that the application transmits to the client computer.

3. The process of claim 1, wherein said selected option comprises storing an encoded version of the most recent session state data for the interactive session on the client computer, said encoding reducing the data size, and the action of implementing said selected option comprises the actions of:

transmitting a message to the client computer specifying said selected option;

receiving client request messages from the client computer, each of the client request messages comprising an encoded version of the most recent session state data for the interactive session; and adding an encoded version of the most recent session state data for the interactive session to each application response message that the application transmits to the client computer.

4. The process of claim 3, wherein either, the encoded version of the most recent session state data in each of the client request messages comprises just the data that a user most recently entered into the client computer, or the encoded version of the most recent session state data in each of the client request messages comprises a compressed version of said data, and the encoded version of the most recent session state data in each application response message comprises a compressed version of said data.

5. A computer-implemented process for ensuring the availability of an application being hosted on a current data center, comprising:

using one or more server computers in the current data center to perform the following process actions:

detecting a change in run-time conditions of a client computer;

selecting an option for replicating session state data associated with an interactive session established between a user of the client computer and the application executing on the one or more server computers, said selection being based on performance constraints and resource cost constraints, and a prioritization thereof, that are specified by the application, said selection being made from a set of different session state data replication options, each of said options having different performance and resource cost trade-offs, said selected option determining how, including where, said data is to be replicated; and implementing said selected option, the implementation resulting in said data being replicated outside of the current data center, thus ensuring that said data remains available in the event that the current data center goes offline, and wherein said selected option comprises asynchronously storing the most recent session state data for the interactive session in one or more backup data centers, and the action of implementing said selected option comprises the actions of, uploading the most recent session state data for the interactive session to the backup data centers whenever the session state changes, and responding to a client request message received from the client computer before a confirmation message is received from at least one of the backup data centers indicating that it has successfully stored the most recent session state data, the client computer waiting to expose said response to a user until said confirmation message is received from at least one of the backup data centers.

6. The process of claim 5, wherein the action of uploading the most recent session state data for the interactive session to the backup data centers whenever the session state changes comprises an action of adding forward error correction codes to said state data before it is uploaded to the backup data centers.

7. The process of claim 1, wherein the current data center is serving an interactive session between the application and a plurality of client computers that are jointly participating in the interactive session, and the action of selecting an option for replicating session state data for the application comprises an action of independently selecting a session state data replication option for each of the client computers.

8. The process of claim 1, wherein the action of selecting an option for replicating session state data for the application comprises the actions of:

estimating the latency cost to the client computer associated with each of the different session state data replication options; and selecting a one of said options having the smallest estimated latency cost to the client computer as the option to be used for replicating the session state data for the interactive session.

9. The process of claim 1, wherein the action of selecting an option for replicating session state data for the application comprises the actions of:

inputting one or more of the performance constraints that are specified by the application, the inputted performance constraints comprising a maximum allowable latency cost to the client computer associated with replicating the session state data for the interactive session;

inputting one or more of the resource cost constraints that are specified by the application;

estimating the latency cost to the client computer associated with each of the different session state data replication options;

identifying ones of said options whose estimated latency cost to the client computer is less than or equal to said maximum allowable latency cost;

selecting a one of said identified options that meets the inputted resource cost constraints as the option to be used for replicating the session state data for the interactive session.

10. The process of claim 9, wherein, the inputted resource cost constraints comprise one or more of client resource cost constraints, or data center resource cost constraints, the client resource cost constraints comprise one or more of, a constraint on the network bandwidth cost to the client computer associated with replicating the session state data for the interactive session, or a constraint on the battery energy drain cost to the client computer associated with replicating said session state data, or a constraint on the processing cost to the client computer associated with replicating said session state data, or a constraint on the memory cost to the client computer associated with replicating said session state data, and the data center resource cost constraints comprise one or more of, a constraint on the network bandwidth cost to the current data center associated with replicating said session state data, or a constraint on the data storage cost to the current data center associated with replicating said session state data, or a constraint on the processing cost to the current data center associated with replicating said session state data.

11. The process of claim 1, wherein the action of selecting an option for replicating session state data for the application comprises the actions of:

inputting one or more of the resource cost constraints that are specified by the application;

estimating the latency cost to the client computer associated with each of the different session state data replication options;

identifying ones of said options that meet the inputted resource cost constraints; and selecting the one of said identified options having the smallest estimated latency cost to the client computer as the option to be used for replicating the session state data for the interactive session.

12. A computer-implemented process for providing disaster recovery for an application being hosted on a current data center, comprising:

using a client computer to perform the following process actions:

detecting a change in run-time conditions of the client computer;

whenever the client computer detects change in its run-time conditions, providing notice of the change to the one or more server computers in the current data center;

receiving a message from the current data center specifying an option for replicating session state data associated with an interactive session that has been selected for the client computer based on said detected change, said selection having been based on performance constraints and resource cost constraints, and a prioritization thereof, that are specified by the application, said selection having been made from a set of different session state data replication options, each of said options having different performance and resource cost trade-offs, said specified option including storing the most recent session state data for the interactive session on the client computer, said specified option determining how, including where, said data is to be replicated; and implementing said specified option, including:

adding the most recent session state data for the interactive session to each client request message that the client computer transmits to the application;

receiving application response messages from the application, each of the application response messages comprising the most recent session state data for the interactive session;

extracting the most recent session state data for the interactive session from each of the application response messages; and storing said extracted data on the client computer, the implementation resulting in said data being replicated outside of the current data center, thus ensuring that said data remains available to the client computer in the event that the current data center goes offline.

13. The process of claim 12, wherein said specified option comprises storing an encoded version of the most recent session state data for the interactive session on the client computer, said encoding reducing the data size, and the action of implementing said specified option comprises the actions of:

adding an encoded version of the most recent session state data for the interactive session to each client request message that the client computer transmits to the application;

receiving application response messages from the application, each of the application response messages comprising an encoded version of the most recent session state data for the interactive session;

extracting the encoded version of the most recent session state data for the interactive session from each of the application response messages; and storing said extracted data on the client computer.

14. The process of claim 12, wherein said specified option comprises storing the most recent session state data for the interactive session on the client computer, and the action of implementing said specified option comprises the actions of:

receiving application response messages from the application, each of the application response messages comprising the most recent session state data for the interactive session;

extracting the most recent session state data for the interactive session from each of the application response messages;

storing said extracted data on the client computer;

detecting when the current data center has gone offline and thus has become unable to continue serving the interactive session; and whenever it is detected that the current data center has gone offline, transmitting a session resume request message to a backup data center that has been selected to take over serving the interactive session, said message comprising said stored data.

15. The process of claim 14, wherein, the action of storing said extracted data on the client computer comprises the actions of encrypting the extracted most recent session state data for the interactive session, and storing said encrypted data and an associated encryption key on the client computer, and the session resume request message comprises both said encrypted data and said key.

16. A computer-implemented process for ensuring the availability of an application being hosted on a current data center, comprising:

using one or more server computers in the current data center to perform the following process actions:

detecting a change in run-time conditions of a client computer;

selecting an option for replicating session state data associated with an interactive session established between a user of the client computer and the application executing on the one or more server computers, said selection being based on performance constraints and resource cost constraints, and a prioritization thereof, that are specified by the application, said selection being made from a set of different session state data replication options, each of said options having different performance and resource cost trade-offs, said selected option determining how, including where, said data is to be replicated; and implementing said selected option, the implementation resulting in said data being replicated outside of the current data center, thus ensuring that said data remains available in the event that the current data center goes offline, and wherein said selected option comprises synchronously storing the most recent session state data for the interactive session in one or more backup data centers, and the action of implementing said selected option comprises, uploading the most recent session state data for the interactive session to the backup data centers whenever the session state changes, and waiting to respond to a client request message received from the client computer until a confirmation message is received from at least one of the backup data centers indicating that it has successfully stored the most recent session state data.

17. The process of claim 5, wherein the action of responding to a client request message received from the client computer before a confirmation message is received from at least one of the backup data centers indicating that it has successfully stored the most recent session state data comprises an action of waiting a prescribed period of time after the most recent session state data for the interactive session is uploaded to the backup data centers before responding to the client request message, said period of time being made large enough to ensure that said data has left the current data center.

* * * * *